United States Patent
Park et al.

(10) Patent No.: US 9,456,136 B2
(45) Date of Patent: Sep. 27, 2016

(54) APPARATUS AND METHOD FOR GENERATING IMAGE DATA IN PORTABLE TERMINAL

(71) Applicant: Samsung Electronics Co., Ltd., Suwon-si, Gyeonggi-do (KR)

(72) Inventors: Su-Young Park, Bucheon-si (KR); Yang-Su Kim, Yongin-si (KR); Sung-Ho Son, Daegu (KR); Keum-Ju Jang, Seoul (KR); Ju-Seung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 14/221,695

(22) Filed: Mar. 21, 2014

(65) Prior Publication Data

US 2014/0320594 A1 Oct. 30, 2014

(30) Foreign Application Priority Data

Apr. 30, 2013 (KR) .................... 10-2013-0048166

(51) Int. Cl.
  *H04N 7/00* (2011.01)
  *H04N 5/232* (2006.01)
  *H04N 5/89* (2006.01)

(52) U.S. Cl.
  CPC ................. *H04N 5/23238* (2013.01)

(58) Field of Classification Search
  USPC ....................... 348/36, 37, 38, 39
  See application file for complete search history.

(56) References Cited

U.S. PATENT DOCUMENTS

| | | | |
|---|---|---|---|
| 2008/0159652 A1* | 7/2008 | Shimizu | 382/284 |
| 2008/0192125 A1 | 8/2008 | Kang et al. | |
| 2010/0060750 A1* | 3/2010 | Tomono | 348/222.1 |
| 2010/0066810 A1 | 3/2010 | Ryu et al. | |
| 2010/0265313 A1* | 10/2010 | Liu et al. | 348/36 |

FOREIGN PATENT DOCUMENTS

| | | |
|---|---|---|
| JP | 2011-097246 A | 5/2011 |
| KR | 10-0736565 B1 | 6/2007 |
| KR | 10-0827142 B1 | 4/2008 |
| KR | 10-2008-0075954 A | 8/2008 |
| KR | 10-0869952 B1 | 11/2008 |
| KR | 10-2009-0065914 A | 6/2009 |
| KR | 10-2012-0074493 A | 7/2012 |

OTHER PUBLICATIONS

Andrew Au et al., 'Ztitch: A Mobile Phone Application for Immersive Panorama Creation, Navigation, and Social Sharing', Multimedia Signal Processing (MMSP), 2012 IEEE 14th International Workshop, Sep. 17-19, 2012, 13-18, 978-1-4673-4572.

* cited by examiner

*Primary Examiner* — Daquan Zhao
(74) *Attorney, Agent, or Firm* — Jefferson IP Law, LLP

(57) ABSTRACT

An apparatus and a method for generating image data in a portable terminal are provided. The apparatus method includes when a request for photographing an image is made, detecting a motion of the portable terminal and generating motion information, generating coordinates corresponding to a plurality of image data based on the motion information, combining the plurality of image data based on the coordinates to generate combined image data, and displaying the combined image data.

17 Claims, 14 Drawing Sheets

APPARATUS AND METHOD FOR GENERATING IMAGE DATA IN PORTABLE TERMINAL

CROSS-REFERENCE TO RELATED APPLICATION(S)

This application claims the benefit under 35 U.S.C. §119 (a) of a Korean patent application filed on Apr. 30, 2013 in the Korean Intellectual Property Office and assigned Serial number 10-2013-0048166, the entire disclosure of which is hereby incorporated by reference.

TECHNICAL FIELD

The present disclosure relates to a portable terminal More particularly, the present disclosure relates to an apparatus and a method for generating image data in a portable terminal

BACKGROUND

Portable terminals such as smart phones and a tablet Personal Computers (PCs) provide various useful functions to users through a variety of applications. Accordingly, the portable terminal has transformed into a device which provides not only a voice call function, but a device that provides various additional functions using various types of information. Particularly, the portable terminal may provide a panoramic function when photographing an image. The panoramic function refers to a function that generates an image including scenery within an angle range among all scenery.

A first method to provide the panoramic function combines a plurality of image data generated while a camera of the portable terminal moves in one direction. That is, the first method corresponds to a technology that can determine a correlation between currently photographed image data and previously photographed image data while moving the camera in one direction and generate large size image data while accurately aligning boundary lines of the image data.

A second method induces the user to photograph and thus generate large size image data regardless of a photographing sequence of the image data (KR Patent No. 0869952, a method and an apparatus for panoramic photography). The second method designates first photographed image data as a reference image, and photographs and combines image data in diagonal, left, right, up, and down directions based on the reference image regardless of a photographing sequence.

Accordingly there is a need for an improved method and an apparatus for generating image data which combine a plurality of image data into combined image data based on coordinates.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for generating image data in a portable terminal.

According to the first method described above, consecutive photographing is possible only unidirectionally, and the direction cannot be modified if the consecutive photographing starts. Accordingly, when a panoramic function is executed through the first method, a subject desired by a user may not be included in combined image data sometimes, so that re-photographing is required several times.

According to the second method described above, a first photographed image is set as a reference image. When an area does not exist in which an object desired by the user overlaps the reference image, images cannot be combined, so that the user cannot photograph all desired objects.

Further, when a large size image including a pre-stored image is generated through the first and second methods, a portable terminal starts new photographing to generate the large size image including the stored image, and thus the user is required to re-photograph the stored image.

In order to address the above problems, the present disclosure provides a method and an apparatus for generating image data which combine a plurality of image data into combined image data based on coordinates.

In accordance with an aspect of the present disclosure, an apparatus for generating image data in a portable terminal is provided. The apparatus includes a display unit configured to display combined image data, a motion detector configured to, when a request for photographing an image is made, detect a motion of the portable terminal and generate motion information, and a controller configured to generate coordinates corresponding to a plurality of image data based on the motion information, combine the plurality of image data based on the coordinates to generate the combined image data, and display the combined image data. The present disclosure may provide a method and an apparatus for generating image data which combine a plurality of image data into combined image data based on coordinates, so as to combine a plurality of photographed image data regardless of photographing sequences.

In accordance with another aspect of the present disclosure, a method of generating image data in a portable terminal is provided. The method includes when a request for photographing an image is made, detecting a motion of the portable terminal and generating motion information, generating coordinates corresponding to a plurality of image data based on the motion information, combining the plurality of image data based on the coordinates to generate combined image data, and displaying the combined image data.

Further, the present disclosure may provide a method and an apparatus for generating image data which combine a plurality of image data into combined image data based on coordinates, so as to generate combined image data based on an already stored image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces The terminal according to the embodiment of the present disclosure includes a portable terminal and a fixed terminal. Here, the portable terminal is an electronic device that is movable to be easily carried, which may be, for example, a video phone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (for example, a notebook computer or a tablet computer), or a digital camera.

Figure 1:
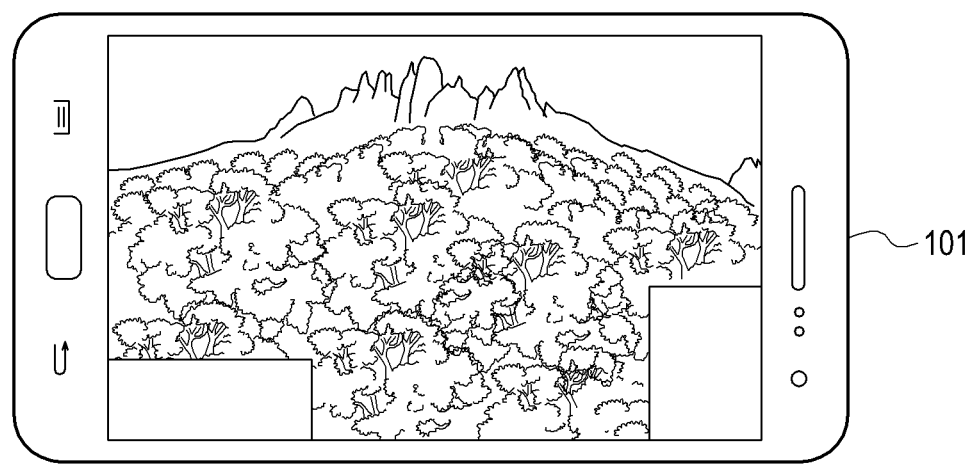
FIG. 1 illustrates a screen displaying combined image data in a portable terminal according to an embodiment of the present disclosure.

FIG. 1 illustrates a screen displaying combined image data in a portable terminal according to an embodiment of the present disclosure.

Referring to FIG. 1, when a request for a panoramic mode is made by a user, the portable terminal generates a plurality of image data according to an imaging request of the user and generates coordinates corresponding to the plurality of generated image data. The panoramic mode refers to a mode that generates an image including scenery within an angle range among all scenery.

The portable terminal places the plurality of image data on a virtual space based on the generated coordinates, combines the plurality of placed image data to generate combined image data, and displays the combined image data as shown on a screen 101.

Figure 2:
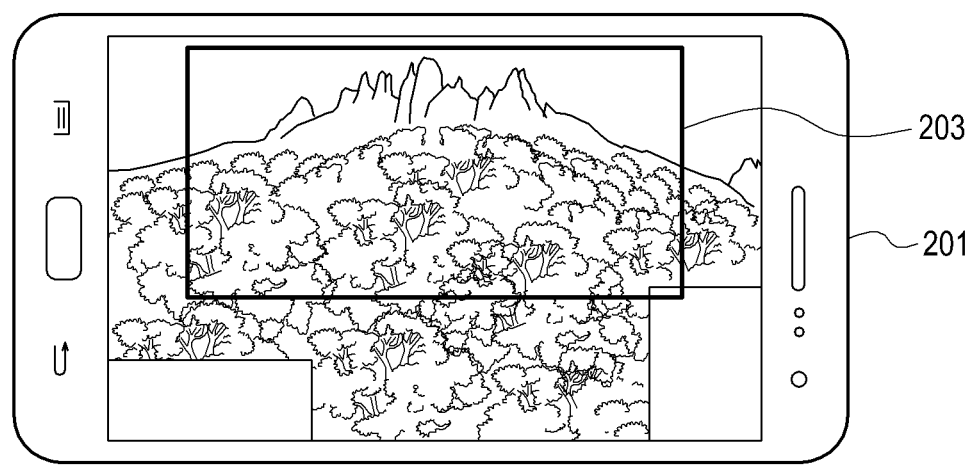
FIG. 2 illustrates a screen selecting a partial area of combined image data in a portable terminal according to an embodiment of the present disclosure.

FIG. 2 illustrates a screen selecting a partial area of combined image data in a portable terminal according to an embodiment of the present disclosure.

Referring to FIG. 2, the portable terminal displays combined image data as shown in a screen 201 a user selects a partial area 203 of the combined image data, and the portable terminal stores the partial area 203 of the combined image data when a request for storing the selected partial area 203 is made. At this time, when the combined image data is displayed and the screen is touched by the user, the portable terminal displays a selection window for selecting a partial area of the combined image data to allow the user to select a partial area desired by the user from the combined image data.

Figure 3:
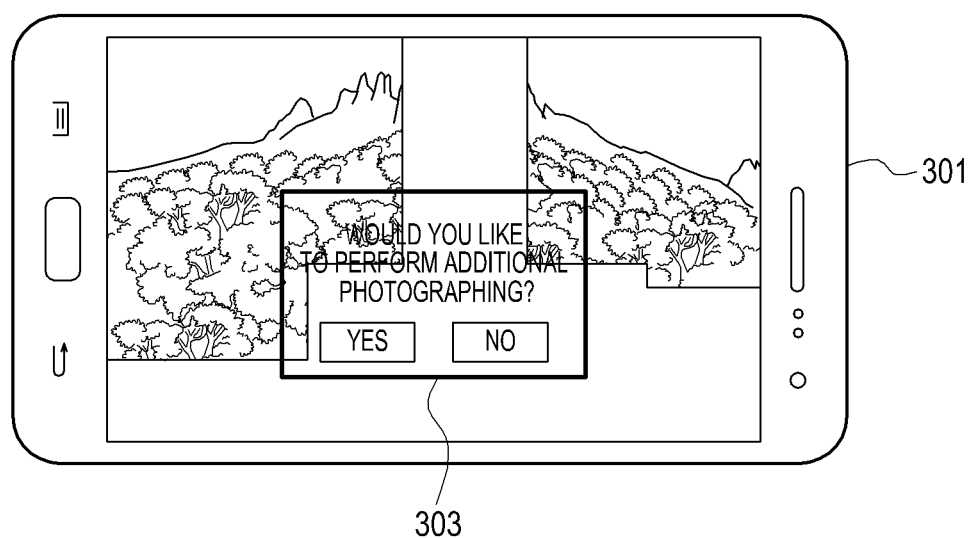
FIG. 3 illustrates a screen asking about additionally photographing combined image data in a portable terminal according to an embodiment of the present disclosure.

FIG. 3 illustrates a screen asking about additionally photographing combined image data in a portable terminal according to an embodiment of the present disclosure.

Referring to FIG. 3, when there are discontinuous areas in the combined image data as shown in a screen 301, the portable terminal outputs a popup window 303 to ask about the additional photographing of images. The discontinuous areas refer to areas generated by dividing the combined image data into a plurality of images because there is no image in a partial area of the combined image data.

For example, when there are the discontinuous areas in the combined image data, the portable terminal may display the popup window 303 including "Would you like to perform additional photographing?", "yes", and "no".

Figure 4A:
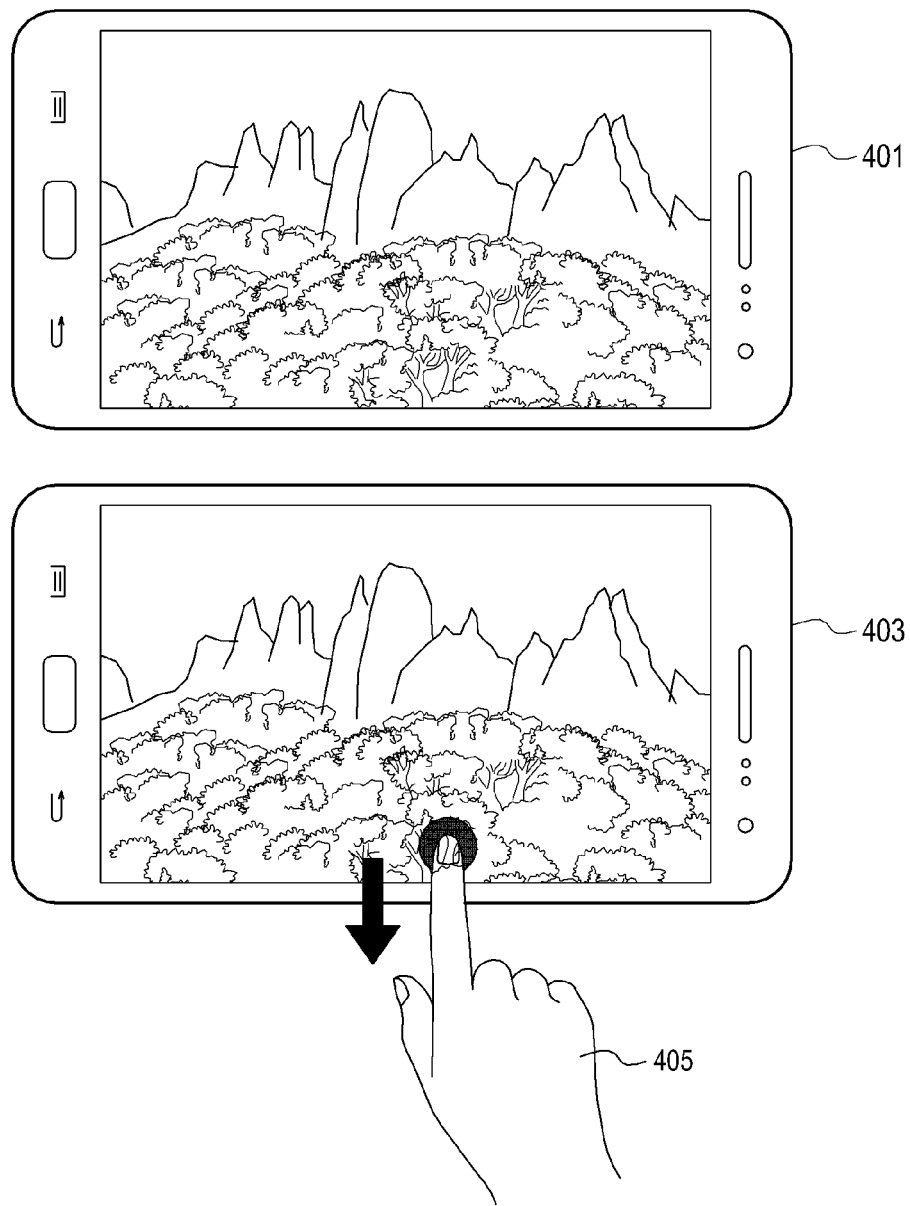
FIGS. 4A and 4B illustrate screens generating combined image data based on selected image data according to an embodiment of the present disclosure.
Figure 4B:
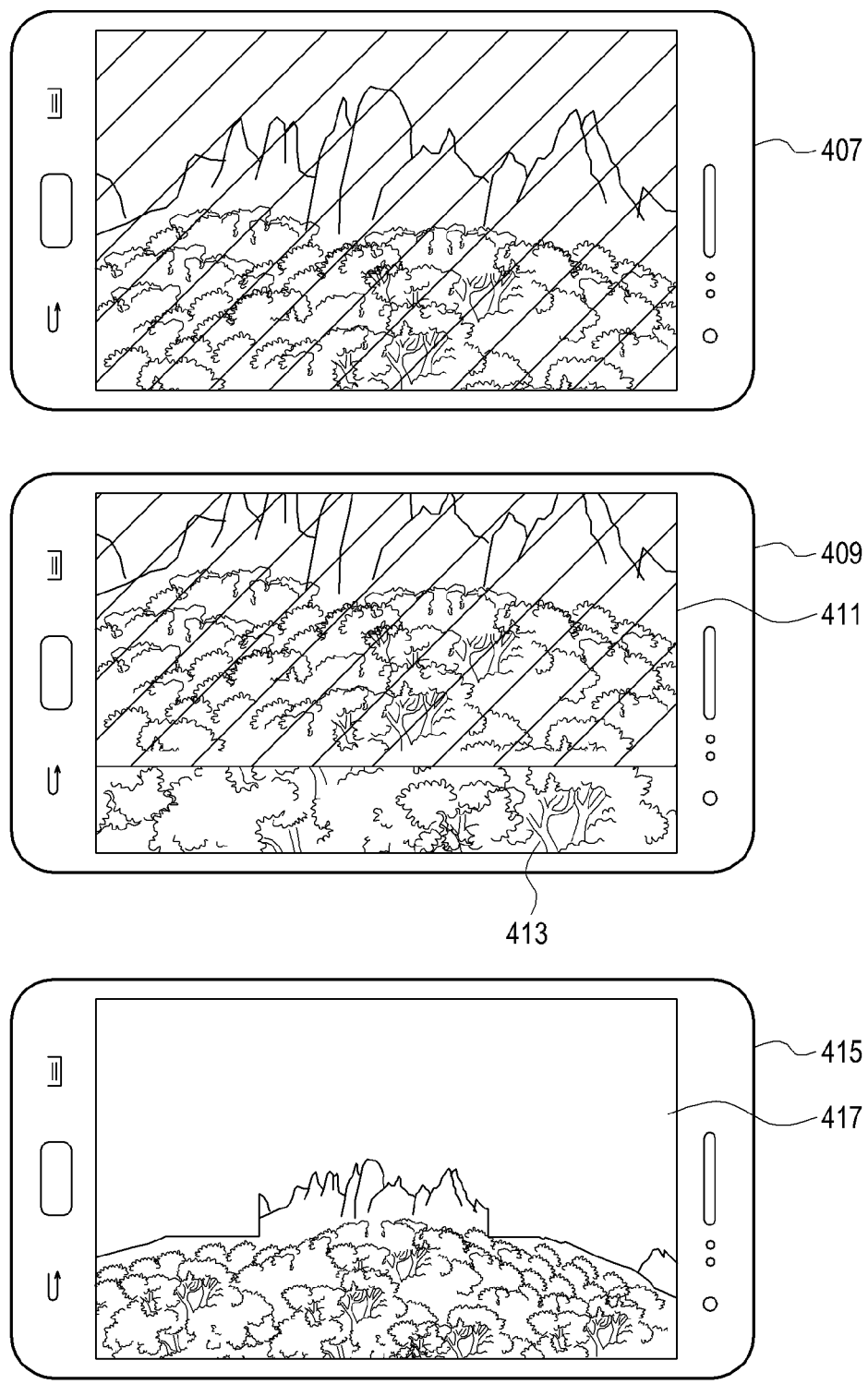

FIGS. 4A and 4B illustrate screens generating combined image data based on selected image data according to an embodiment of the present disclosure.

Referring to FIGS. 4A and 4B, the portable terminal displays a first image among one or more pre-stored images as shown in a screen 401, and identifies whether a request for additional photographing of images is being made, by the user, as shown in a screen 403. For example, when the displayed first image is dragged 405 by the user, the portable terminal may determine that the request for the additional photographing of images is made.

Further, the portable terminal highlights an overlapping portion between the displayed first image and second image data input by a preview mode as shown in a screen 407 in order to perform the additional photographing of images based on the displayed first image. The preview mode refers to a mode that displays, in advance, image data input through a camera to photograph a subject desired by the user.

The portable terminal highlights a part 411 where the first image and the second image data overlap each other and displays a portion 413 where there is no overlapping area without any highlight as shown in a screen 409. When a request for photographing a plurality of images based on the first image is made by the user, the portable terminal combines the first image and the plurality of images to generate a combined image and displays the generated combined image 417 as shown in a screen 415.

Figure 5:
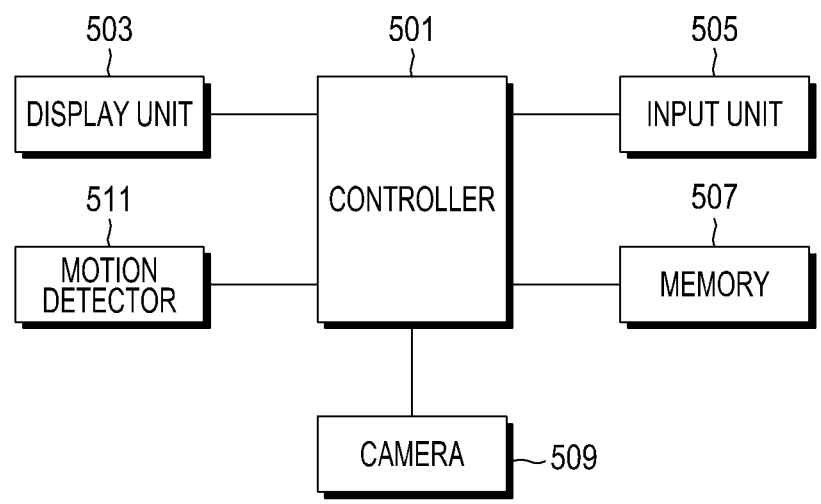
FIG. 5 is a block diagram of a portable terminal according to an embodiment of the present disclosure.

FIG. 5 is a block diagram of the portable terminal according to an embodiment of the present disclosure.

Referring to FIG. 5, the portable terminal includes a controller 501, a display unit 503, an input unit 505, a memory 507, a camera 509, and a motion detector 511.

Hereinafter, each of the components will be described. The input unit 505 includes keys (not shown) for inputting number and character information and function keys for setting various functions, and the display unit 503 displays an image signal on a screen and displays data of which an output is requested by the controller 501. When the display unit 503 is implemented by a touch display screen type such as a capacitive type or a resistive type, the input unit 505 may include only a minimum of keys and the display unit 503 may replace a part of key input functions of the input unit 505.

The memory 507 includes a program memory and a data memory. The program memory stores a booting system and an Operating System (OS) for controlling a general operation of the portable terminal, and the data memory stores various data generated during the operation of the portable terminal.

The memory 501 may store a table like Table 1 showing a distance between a subject for each size of a particular object and the portable terminal

TABLE 1

| Object name | Object size | Distance between subject and portable terminal |
|---|---|---|
| Leaf | 1 cm | 10 km |
| | ... | ... |
| | 0.1 cm | 100 km |
| tree | 10 cm | 10 km |
| | ... | ... |
| | 1 cm | 100 km |

The camera 509 photographs an image of the subject to generate image data and outputs the generated image data to the controller 501. The motion detector 511 detects a motion of the portable terminal and outputs a result of the detection to the controller 501. The motion detector 511 may include a geomagnetic field sensor (not shown) and an acceleration sensor (not shown), identifies a progress direction of the portable terminal by using the geomagnetic sensor, and identify a movement angle of the portable terminal by using the acceleration sensor. The motion detector 511 outputs motion information including the identify progress direction and movement angle of the portable terminal to the controller 501. For example, when the portable terminal moves in a left direction by 3 degrees, the motion detector 511 may identify that the progress direction of the portable terminal is in the left direction by using the geomagnetic sensor and identify that the movement angle of the portable terminal is 3 degrees by using the acceleration sensor.

The controller 501 performs a function of controlling the general operation of the portable terminal. The controller 501 may allocate coordinates to image data photographed by the user, places the image data based on the allocated coordinates, and combines the placed image data, so as to generate combined data. As a result of the identification, when the request for the panoramic mode is made, the controller 501 executes the panoramic mode.

More specifically, in a first embodiment, the controller 501 identifies whether the request for the panoramic mode is being made by the user. The panoramic mode refers to a mode that generates an image including scenery within an angle range among all the scenery.

At this time, when a request for executing a camera function is made by the user, the controller 501 drives the camera 509, and activates a preview mode to output image data sequentially input from the camera 509 to the display unit 503. The preview mode refers to a mode that displays in advance image data input through the camera 509 to photograph a subject desired by the user. When a plurality of menus including a camera mode menu are displayed and the camera mode menu is selected by the user from the plurality of displayed menus, the controller 501 displays a menu including a general photographing mode and a panoramic mode. When the panoramic mode is selected by the user from the displayed menus, the controller 501 determines that a request for the panoramic mode is made.

The controller 501 determines whether a request for photographing image data is being made by the user. As a result of the determination, when the request for the image data is made, the controller 501 generates a coordinate corresponding to image data input from the camera 509 and stores the generated coordinates corresponding to the input image data.

Figure 7A:
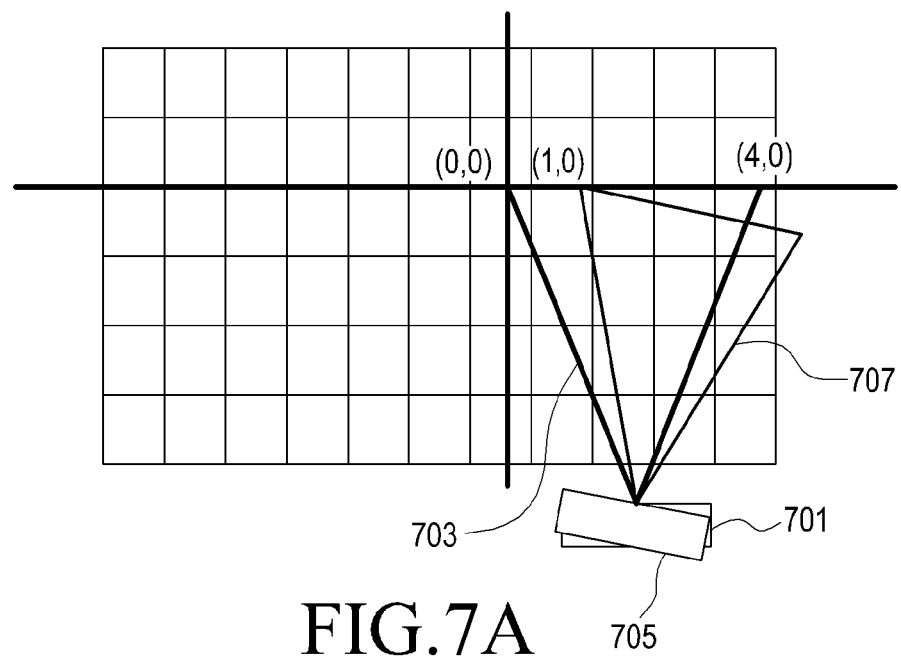
FIGS. 7A and 7B illustrate a first virtual space according to a first embodiment of the present disclosure.
Figure 7B:
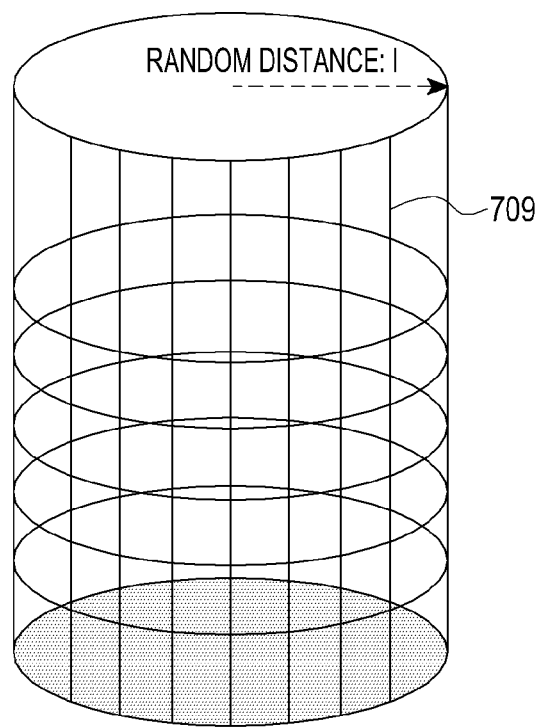

When the image data corresponds to first image data first photographed while the panoramic mode is executed, the controller 501 matches a reference coordinate with the first image data. The reference coordinate refers to a coordinate which is a reference point of a virtual space, for example, (0, 0) of a (x, y) coordinate. For example, as illustrated in FIGS. 7A and 7B, when the portable terminal receives a request for photographing an image at a first position 701 by the user, the controller 501 may generate first image data and generate a reference coordinate (0, 0) 703 to correspond to the first image data.

When the image data is second image data photographed after the first image data, the controller 501 receives motion information from the motion detector 511, generates a coordinate based on the received motion information, and matches the coordinate with the second image data. The motion information refers to information on a motion of the portable terminal from a time point when the first image data is photographed to a time point when a request for photographing the second image data is made, and includes a movement direction and a movement angle of the portable terminal.

More specifically, the controller 501 generates the coordinate corresponding to the second image data by using three methods below.

A first method generates a coordinate based on an acceleration sensor resolution when a rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

At this time, the controller 501 sets the acceleration sensor resolution as a reference coordinate unit and generates a coordinate by using the movement direction and the movement angle, so as to realize a cylindrical coordinate system 709 as shown in FIGS. 7A and 7B. The basic coordinate unit in the cylindrical coordinate system 709 refers to a coordinate unit that moves on an x axis or a y axis per acceleration sensor resolution in a coordinate system. For example, the basic coordinate unit may be one box.

For example, as illustrated in FIGS. 7A and 7B, when the portable terminal rotates by 0.3 degrees in a right direction and thus moves from a first position 701 to a second position 705 and a request for photographing an image is made at the second position 705 by the user, the controller 501 may generate second image data, receive motion information including a movement direction (right direction) and a movement angle (0.3 degrees) of the portable terminal from the motion detector 511, and generate a coordinate (1, 0) 707 corresponding to the second image data based on the motion information. Alternatively, when the controller 501 receives motion information including a movement direction and a movement angle of the portable terminal corresponding to a left direction and 3 degrees, the controller 501 may generate a coordinate (−10, 0) corresponding to the second image data.

A second method generates a coordinate based on the acceleration sensor resolution and a geomagnetic sensor resolution when the rotary translation and a horizontal translation of the portable terminal are performed. The rotary translation refers to the rotational movement of the portable terminal based on the user, and the horizontal translation refers to a horizontal movement of the portable terminal by the user. The acceleration sensor resolution refers to a minimum movement angle which can be recognized by the acceleration sensor. For example, the acceleration sensor resolution may be 0.3 degrees. The geomagnetic sensor resolution refers to a minimum movement distance which can be recognized by the geomagnetic sensor. For example, the geomagnetic sensor resolution may be 1 cm.

Figure 8A:
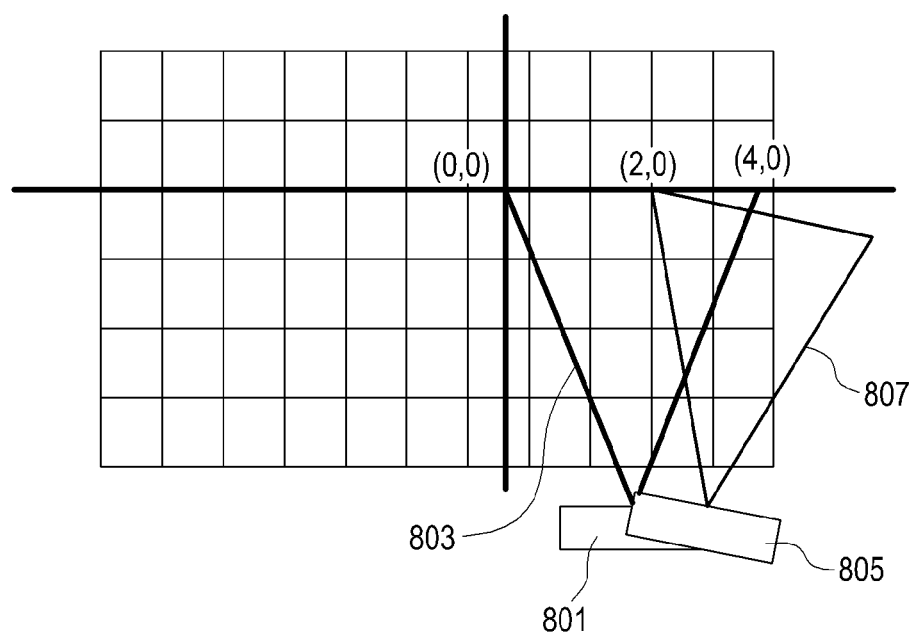
FIGS. 8A and 8B illustrate a second virtual space according to a second embodiment of the present disclosure.
Figure 8B:
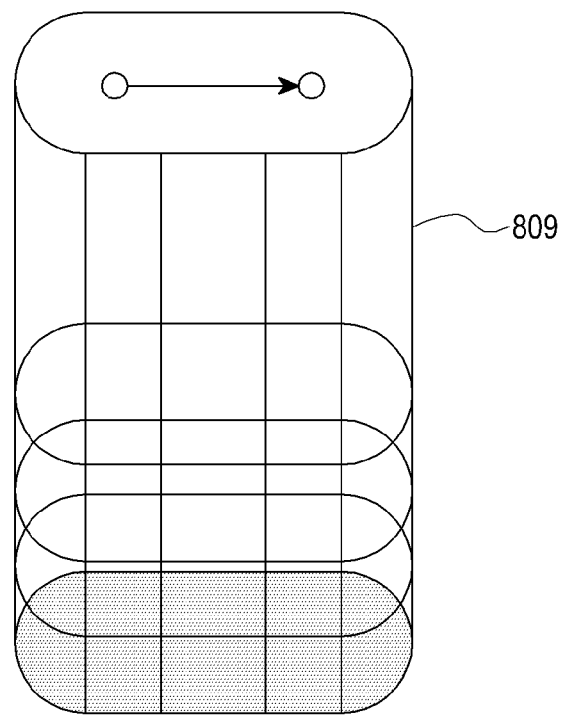

At this time, the controller 501 sets the acceleration sensor resolution and the geomagnetic sensor resolution as the reference coordinate units, respectively, and generates a coordinate by using the movement direction, the movement angle, and the movement distance, so as to realize a long circular coordinate system 809 as shown in FIGS. 8A and 8B. The basic coordinate unit in the long circular coordinate system 809 refers to a coordinate unit that moves on an x axis or a y axis from a reference coordinate (0, 0) 803 per acceleration sensor resolution or geomagnetic sensor resolution in the coordinate system. For example, the basic coordinate unit may be one box.

For example, as illustrated in FIGS. 8A and 8B, when the portable terminal rotates by 0.3 degrees in a right direction and moves by 1 cm and thus moves from a third position 801 to a fourth position 805 and a request for photographing an image is made at the fourth position 805 by the user, the controller 501 may generate second image data, receive motion information including a movement direction (right direction), a movement angle (0.3 degrees), and a movement distance (1 cm) of the portable terminal from the motion detector 511, and generate a coordinate (2, 0) 807 corresponding to the second image data based on the motion information. Alternatively, when the controller 501 receives motion information including a movement direction, a movement angle, and a movement distance of the portable terminal corresponding to a left direction, 3 degrees, and 5 cm, the controller 501 may generate a coordinate (−15, 0) corresponding to the second image data.

A third method generates a coordinate based on the acceleration sensor resolution and a distance 905 between a user 901 and a portable terminal 903 when the rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

The controller 501 may receive image data including the user input from a front camera included in the camera 509 and analyze a user image of the received image data, so as to estimate a distance between the user and the portable terminal. Alternatively, the controller 501 may estimate the distance between the user and the portable terminal by using a proximity sensor included in the motion detector 511.

The controller 501 calculates the acceleration sensor resolution and the basic coordinate unit corresponding to the acceleration sensor resolution based on the distance between the user and the portable terminal. For example, the controller 501 may calculate the basic coordinate unit by using Equation (1) below.

$$I = 2 \times d \times \sin(a) \qquad \text{Equation (1)}$$

In Equation (1), 'I' denotes a basic coordinate unit, 'd' denotes a distance between the user and the portable terminal, and 'a' denotes an acceleration sensor resolution. For example, when d is 10 cm and 'a' is 0.3 degrees, 'I' may be about 0.105.

Figure 9A:
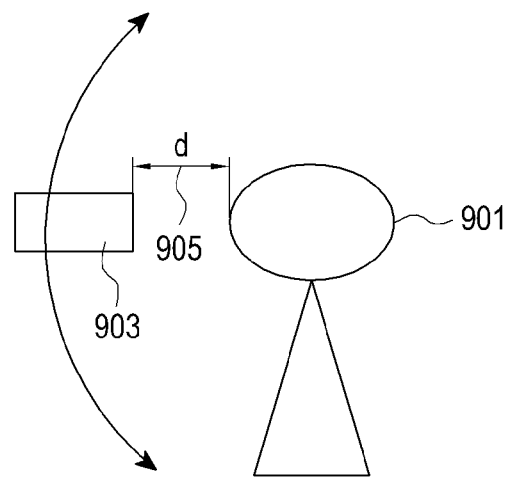
FIGS. 9A and 9B illustrates a third virtual space according to a third embodiment of the present disclosure.
Figure 9B:
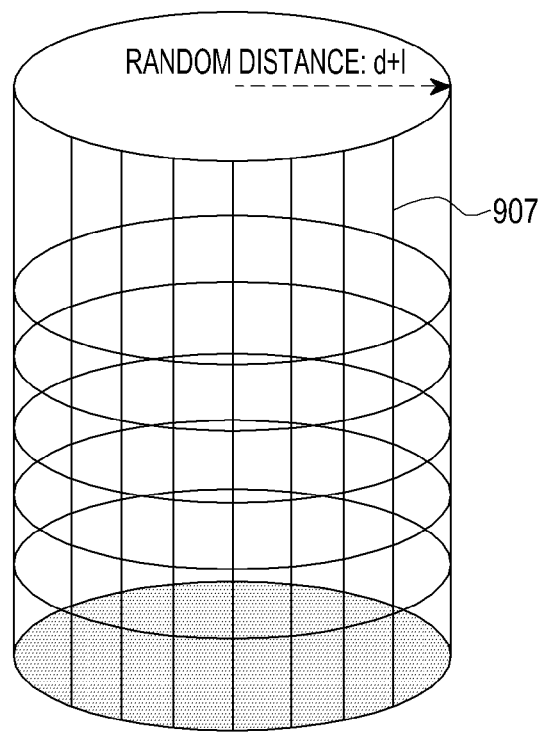

At this time, the controller 501 sets the acceleration sensor resolution as the reference coordinate unit and generates a coordinate by using a movement direction and a movement angle, so as to realize a circular coordinate system 907 as shown in FIGS. 9A and 9B.

For example, when the portable terminal rotates by 0.3 degrees in a right direction and thus moves from a fifth position to a sixth position and a request for photographing an image is made at the sixth position by the user, the controller 501 may generate second image data, receive motion information including a movement direction (right direction) and a movement angle (0.3 degrees) of the portable terminal from the motion detector 511, estimate a distance (10 cm) between the user and the portable terminal, and generate a coordinate (0.105, 0) corresponding to the second image data based on the motion information and the estimated distance.

As described above, the controller 501 generates coordinates corresponding to third and fourth image data which are generated after the second image data by using the first to third methods. The controller 501 generates a coordinate corresponding to current image data based on a coordinate corresponding to previous image data. For example, when the portable terminal generates second image data, rotates by 0.3 degrees in a right direction, and receives a request for photographing third image data, the controller 501 may determine that the portable terminal moves one box on an x axis based on the coordinate (1, 0) of the second image data in the coordinate system and generate a coordinate (2, 0) corresponding to the third image data. The controller 501 generates a coordinate corresponding to fourth image data based on the coordinate corresponding to the third image data by repeatedly performing such an operation.

Further, the controller 501 combines a plurality of image data based on a plurality of coordinates corresponding to a plurality of generated image data, so as to generate combined image data. At this time, the controller 510 combines the image data after placing the plurality of image data on a virtual coordinate system based on the plurality of coordinates.

Figure 6:
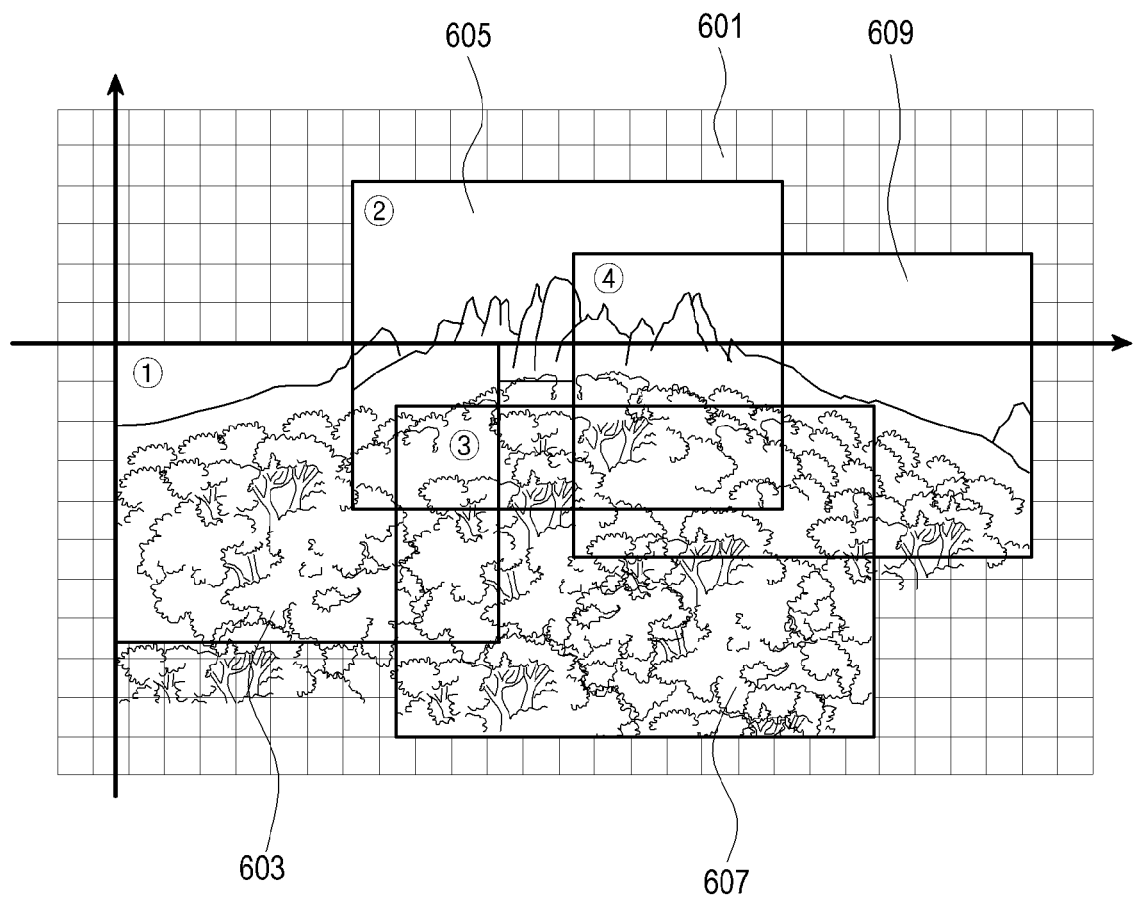
FIG. 6 illustrates a virtual space where image data is combined according to an embodiment of the present disclosure.
Figure 10:
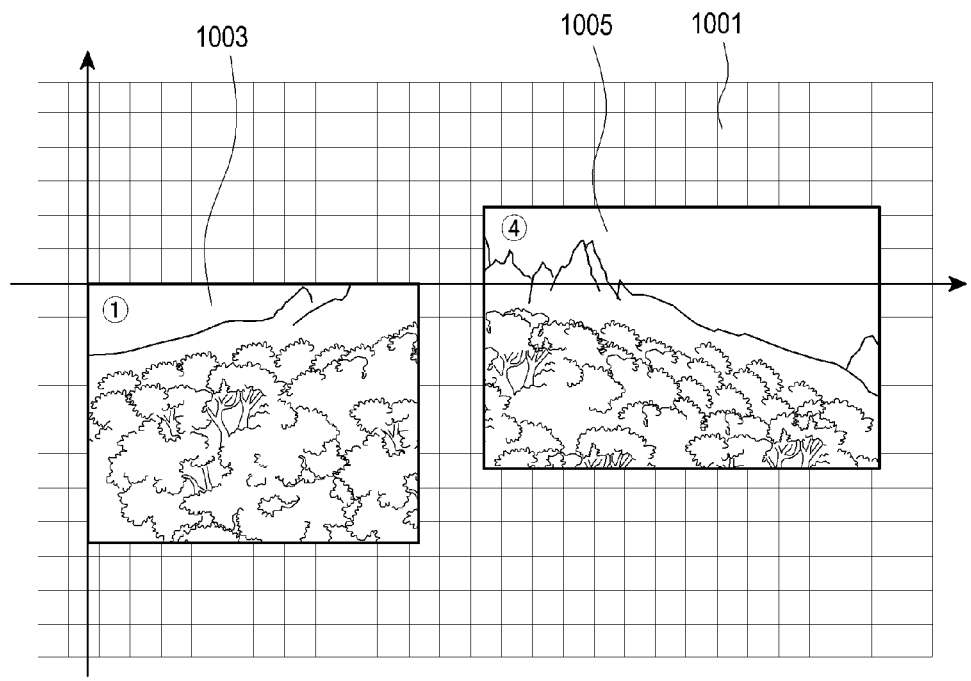
FIG. 10 illustrates a coordinate space where image data is placed according to an embodiment of the present disclosure.

For example, as illustrated in FIG. 6, when coordinates of first to fourth image data are (0,0), (6, 4), (7, −2), and (12, 2), the controller 501 may place the first to fourth image data 603, 605, 607, and 609 on a virtual coordinate system 601 and combines the placed first to fourth image data 603, 605, 607, and 609, so as to generate combined image data as shown in the screen 101 of FIG. 1. Alternatively, as illustrated in FIG. 10, when coordinates of first and second image data are (0, 0) and (12, 2), the controller 501 may place the first and second image data on a virtual coordinate system 1101 and combine the placed first and second image data 1103 and 1105, so as to generate combined image data as shown in the screen 301 of FIG. 3.

The controller 501 determines whether a request for photographing the image is being made by the user. As a result of the determination, when the request for photographing the image is made, the controller 501 displays the combined image data. For example, the controller 501 may display the combined image data as shown in the screen 101 of FIG. 1. Alternatively, the controller 501 may display the combined image data as shown in the screen 301 of FIG. 3.

The controller 501 identifies whether there are discontinuous areas in the combined image data by analyzing the combined image data. The discontinuous areas refer to areas generated by dividing the combined image data into a plurality of images because there is no image in a partial area of the combined image data. For example, when the combined image data shown in the screen 301 of FIG. 3 is displayed, the controller 501 may determine that there are the discontinuous areas in the combined image data.

As a result of the determination, when there are the discontinuous areas, the controller 501 displays a message suggesting additional photographing of images to fill in the discontinuous areas from the combined image data. For example, when there are the discontinuous areas in the combined image data, the controller 501 may display the popup window 303 including "Would you like to perform additional photographing?", "yes", and "no".

The controller 501 determines whether a request for the additional photographing of images is being made by the user. As a result of the determination, when there is the request for the additional photographing of images, the controller 501 generates one or more coordinates corresponding to one or more image data additionally photographed through the above operation and combines the additionally photographed image data with the combined image data based on the coordinates, so as to generate and display new combined image data. When the request for the additional photographing of images is not made, the controller 501 ends the panoramic mode.

When there is no discontinuous area, the controller 501 determines whether a request for storing a partial image is being made by the user to store a partial area of the combined image.

When the request for storing the partial image is made, the controller 501 stores the partial area of the combined image data selected by the user and ends the panoramic mode. For example, as illustrated in FIG. 2, when a partial area 203 of the combined image data is selected by the user, the controller 501 may store the selected partial area 203. When the request for storing the partial area is not made, the controller 501 ends the panoramic mode.

In a second embodiment, the controller 501 determines whether the request for the panoramic mode is being made by the user. The panoramic mode refers to a mode that generates an image including scenery within an angle range among all scenery. As a result of the determination, when the request for the panoramic mode is made, the controller 501 executes the panoramic mode.

Further, the controller 501 determines whether a request for photographing image data is being made by the user. As a result of the determination, when the request for photographing the image data is made, the controller 501 generates a coordinate corresponding to image data input from the camera 509 and stores the generated coordinate corresponding to the input image data.

When the image data corresponds to first image data first photographed while the panoramic mode is executed, the controller 501 matches a reference coordinate with the first image data. The reference coordinate refers to a coordinate which is a reference point of a virtual space, for example, (0, 0) of a (x, y) coordinate. For example, as illustrated in FIGS. 7A and 7B, when the portable terminal receives a request for photographing an image at a first position 701 by the user, the controller 501 may generate first image data and generate a reference coordinate (0, 0) 703 to correspond to the first image data.

When the image data is second image data photographed after the first image data, the controller 501 receives motion information from the motion detector 511, generates a coordinate based on the received motion information, and matches the coordinate with the second image data. The motion information refers to information on a motion of the portable terminal from a time point when the first image data is photographed to a time point when a request for photographing the second image data is made, and includes a movement direction and a movement angle of the portable terminal.

At this time, the controller 501 generates a coordinate corresponding to the second image data by using the above described first to third methods. Further, the controller 501 generates coordinates corresponding to third and fourth image data which are generated after the second image data by using the first to third methods.

The controller 501 combines a plurality of image data by using a plurality of coordinates corresponding to a plurality of generated image data and an image processing scheme to generate combined image data. The image processing scheme is a scheme that searches for areas (hereinafter, referred to as "the same areas") having the same images among a plurality of image data, which will not be described in detail since it is an already known technology.

More specifically, the controller 501 places a plurality of image data on a virtual coordinate system based on a plurality of coordinates and searches for the same areas existing among the placed image data by using the image processing scheme. The controller 501 relocates the plurality of image data such that the same areas searched from the plurality of image data overlap each other, and combines the relocated image data.

For example, as illustrated in FIG. 6, when coordinates of the first to fourth image data correspond to (0,0), (6, 4), (7, −2), and (12, 2), the controller 501 may place the first to fourth image data 603, 605, 607, and 609 on a virtual coordinate system 601. The controller 501 may search for the same areas among the placed first to fourth image data 603, 605, 607, and 609 by using the image processing scheme, relocate the first to fourth image data 603, 605, 607, and 609 on the virtual coordinate system 601 such that the same areas searched from the image data overlap each other, and combine the relocated first to fourth image data 603, 605, 607, and 609, so as to generate combined image data as shown in the screen 101 of FIG. 1.

The controller 501 determines whether a request for ending the image photographing is being made by the user. As a result of the determination, when the request for ending the image photographing is made, the controller 501 displays the combined image data. For example, the controller 501 may display the combined image data as shown in the screen 101 of FIG. 1.

The controller 501 determines whether there are discontinuous areas in the combined image data by analyzing the combined image data. The discontinuous areas refer to areas generated by dividing the combined image data into a plurality of images because there is no image in a partial area of the combined image data. For example, when the combined image data shown in the screen 301 of FIG. 3 is displayed, the controller 501 may determine that there are the discontinuous areas in the combined image data.

As a result of the determination, when there are the discontinuous areas, the controller 501 displays a message suggesting additional photographing of to fill in the discontinuous areas from the combined image data. For example, when there are the discontinuous areas in the combined image data, the controller 501 may display the popup window 303 including "Would you like to perform additional photographing?", "yes", and "no".

The controller 501 determines whether a request for the additional photographing of images is being made by the user. As a result of the determination, when there is the request for the additional photographing of images, the controller 501 generates one or more coordinates corresponding to one or more image data additionally photographed through the above operation and combines the additionally photographed image data with the combined image data based on the coordinates and the image processing scheme, so as to generate and display new combined image data. When the request for the additional photographing of images is not made, the controller 501 ends the panoramic mode.

When there is no discontinuous area, the controller 501 determines whether a request for storing a partial image is being made by the user to store a partial area of the combined image.

When the request for storing the partial image is made, the controller 501 stores the partial area of the combined image data selected by the user and ends the panoramic mode. For example, as illustrated in FIG. 2, when a partial area 203 of the combined image data is selected by the user, the controller 501 may store the selected partial area 203. When the request for storing the partial area is not made, the controller 501 ends the panoramic mode.

In a third embodiment, the controller 501 determines whether the request for the panoramic mode is being made by the user. The panoramic mode refers to a mode that generates an image including scenery within an angle range among all scenery. As a result of the determination, when the request for the panoramic mode is made, the controller 501 executes the panoramic mode.

Further, the controller 501 determines whether a request for photographing image data is being made by the user. As a result of the determination, when the request for photographing the image data is made, the controller 501 estimates a distance between the subject and the portable terminal. At this time, the controller 501 receives image data including the subject, detects a particular object included in the image data, and estimates a distance between the subject and the portable terminal based on a size of the detected particular object.

For example, when the memory 505 stores Table 1 showing the distance between the portable terminal and the subject for each size of the particular object, the controller 501 may estimate the distance between the subject and the portable terminal based on Table 1.

The controller 501 generates a coordinate corresponding to image data input from the camera 509 and stores the generated coordinate corresponding to the input image data.

When the image data corresponds to first image data first photographed while the panoramic mode is executed, the controller 501 matches a reference coordinate with the first image data. The reference coordinate refers to a coordinate which is a reference point of a virtual space, for example, (0, 0) of a (x, y) coordinate. For example, as illustrated in FIGS. 7A and 7B, when the portable terminal receives a request for photographing an image at a first position 701 by the user, the controller 501 may generate first image data and generate a reference coordinate (0, 0) 703 to correspond to the first image data.

When the image data is second image data photographed after the first image data, the controller 501 receives motion information from the motion detector 511, generates a coordinate based on the received motion information and the estimated distance between the subject and the portable terminal, and matches the coordinate with the second image data. The motion information refers to information on a motion of the portable terminal from a time point when the first image data is photographed to a time point when a request for photographing the second image data is made, and includes a movement direction and a movement angle of the portable terminal.

More specifically, the controller 501 generates the coordinate corresponding to the second image data by using three methods below.

A fourth method generates a coordinate based on the distance between the subject and the portable terminal and the acceleration sensor resolution when the rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

The controller 501 determines the basic coordinate unit based on the distance between the subject and the portable terminal and the acceleration sensor resolution and generates a coordinate by using a movement direction and a movement angle, so as to implement a cylindrical coordinate system. The basic coordinate unit in the cylindrical coordinate system refers to a coordinate unit that moves on an x axis or a y axis per acceleration sensor resolution.

For example, the controller 501 may determine the basic coordinate unit by using Equation (2) below.

$$I=2\times l\times\sin(a) \quad \text{Equation (2)}$$

In Equation (2), 'I' denotes a basic coordinate unit, 'l' denotes a distance between the subject and the portable terminal, and 'a' denotes an acceleration sensor resolution. For example, when 'l' is 1,000 cm and 'a' is 0.3 degrees, 'I' may be about 10.5.

For example, when the distance between the subject and the portable terminal is 1,000 cm and the portable terminal rotates by 0.3 degrees in a right direction and thus moves from a seventh potion to an eighth position and a request for photographing an image is made at the eighth position by the user, the controller 501 may generate second image data, receive motion information including a movement direction (right direction) and a movement angle (0.3 degrees) of the portable terminal from the motion detector 511, and generate a coordinate (10.5, 0) corresponding to the second image data based on the distance between the subject and the portable terminal, the motion information, and an estimated distance.

A fifth method generates a coordinate based on the distance between the subject and the portable terminal, the acceleration sensor resolution, and the geomagnetic sensor resolution when the rotary translation and the horizontal translation of the portable terminal are performed. The rotary translation refers to the rotational movement of the portable terminal based on the user, and the horizontal translation refers to a horizontal movement of the portable terminal by the user. The acceleration sensor resolution refers to a minimum movement angle which can be recognized by the acceleration sensor. For example, the acceleration sensor resolution may be 0.3 degrees. The geomagnetic sensor resolution refers to a minimum movement distance which can be recognized by the geomagnetic sensor. For example, the geomagnetic sensor resolution may be 1 cm.

The controller 501 may determine a first basic coordinate unit based on the geomagnetic sensor resolution, determines a second basic coordinate unit based on the acceleration sensor resolution and the distance between the subject and the portable terminal, and generates a coordinate by using a movement direction, a movement angle, and a movement distance, so as to implement a long circular coordinate system. The first basic coordinate unit refers to a coordinate unit that moves on an x axis per geomagnetic sensor resolution in the coordinate system, and the second basic coordinate unit refers to a coordinate unit that moves on an x axis or a y axis per acceleration sensor resolution in the coordinate system. For example, the first basic coordinate unit may be one box, and the second basic coordinate unit may be determined by using Equation (2).

For example, when the distance between the subject and the portable terminal is 1,000 cm and the portable terminal rotates by 0.3 degrees in a right direction and moves by 1 cm and thus moves from a ninth potion to a tenth position and a request for photographing an image at the tenth position is made by the user, the controller 501 may generate second image data, receive motion information including a movement direction (right direction), a movement angle (0.3 degrees), and a movement distance (1 cm) of the portable terminal from the motion detector 511, and generate a coordinate (11.05, 0) corresponding to the second image data based on the distance between the subject and the portable terminal and the motion information.

A sixth method generates a coordinate based on the acceleration sensor resolution, a distance between the user and the portable terminal, and a distance between the subject and the portable terminal when the rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

The controller 501 may receive image data including the user input from a front camera included in the camera 509 and analyze a user image of the received image data, so as to estimate a distance between the user and the portable terminal or estimate the distance between the user and the portable terminal by using a proximity sensor included in the motion detector 511.

The controller 501 calculates the basic coordinate unit corresponding to the acceleration sensor resolution based on the acceleration sensor resolution, the distance between the user and the portable terminal, and the distance between the subject and the portable terminal. For example, the controller 501 may calculate the basic coordinate unit by using Equation (3) below.

$$I=2\times(d+l)\times\sin(a) \quad \text{Equation (3)}$$

In Equation (3), 'I' denotes a basic coordinate unit, 'd' denotes a distance between the user and the portable terminal, 'l' denotes a distance between the subject and the portable terminal, and 'a' denotes an acceleration sensor resolution. For example, when 'd' is 10 cm, 'l' is 1,000 cm, and 'a' is 0.3 degrees, 'I' may be about 10,577.

As described above, the controller 501 determines the basic coordinate unit based on the acceleration sensor resolution, the distance between the user and the portable terminal, and the distance between the subject and the portable terminal and generates a coordinate by using a movement direction and a movement angle, so as to implement a circular coordinate system.

For example, when the portable terminal rotates by 0.3 degrees in a right direction and thus moves from an eleventh position to a twelfth position and a request for photographing an image at the twelfth position is made by the user, the controller 501 may generate second image data, receive motion information including a movement direction (right direction) and a movement angle (0.3 degrees) of the portable terminal from the motion detector 511, estimate a distance (10 cm) between the user and the portable terminal and a distance (1,000 cm) between the subject and the portable terminal, and generate a coordinate (10,577, 0) corresponding to the second image data based on the motion information and the estimated distances.

As described above, the controller 501 generates coordinates corresponding to third and fourth image data which are generated after the second image data by using the fourth to sixth methods. The controller 501 generates a coordinate corresponding to current image data based on a coordinate corresponding to previous image data.

The controller 501 combines a plurality of image data by using a plurality of coordinates corresponding to a plurality of generated image data and an image processing scheme to generate combined image data. The image processing scheme corresponds to a scheme that searches for the same areas among a plurality of image data, and a detailed description of the image processing scheme will not be made since it is an already known technology.

More specifically, the controller 501 places a plurality of image data on a virtual coordinate system based on a plurality of coordinates and searches for the same areas existing among the placed image data by using the image processing scheme. The controller 501 relocates the plurality of image data such that the same areas searched from the plurality of image data overlap each other, and combines the relocated image data.

For example, as illustrated in FIG. 6, when coordinates of the first to fourth image data correspond to (0,0), (6, 4), (7, −2), and (12, 2), the controller 501 may place the first to fourth image data 603, 605, 607, and 609 on the virtual coordinate system 601. The controller 501 may search for the same areas among the placed first to fourth image data 603, 605, 607, and 609 by using the image processing scheme, relocate the first to fourth image data 603, 605, 607, and 609 on the virtual coordinate system 601 such that the same areas searched from the image data overlap each other, and combine the relocated first to fourth image data 603, 605, 607, and 609, so as to generate combined image data as shown in the screen 101 of FIG. 1.

The controller 501 determines whether a request for ending the image photographing is being made by the user. As a result of the determination, when the request for ending the image photographing is made, the controller 501 displays the combined image data. For example, the controller 501 may display the combined image data as shown in the screen 101 of FIG. 1.

The controller 501 determines whether there are discontinuous areas in the combined image data by analyzing the combined image data. The discontinuous areas refer to areas generated by dividing the combined image data into a plurality of images because there is no image in a partial area of the combined image data. For example, when the combined image data shown in the screen 301 of FIG. 3 is displayed, the controller 501 may determine that there are the discontinuous areas in the combined image data.

As a result of the determination, when there are the discontinuous areas, the controller 501 displays a message suggesting additional photographing to fill in the discontinuous areas from the combined image data. For example, when there are the discontinuous areas in the combined image data, the controller 501 may display the popup window 303 including "Would you like to perform additional photographing?", "yes", and "no".

The controller 501 determines whether a request for additional photographing of images is being made by the user. As a result of the determination, when there is the request for the additional photographing of images, the controller 501 generates one or more coordinates corresponding to one or more additionally photographed image data through the above operation and combines the additionally photographed image data with the combined image data based on the coordinates and the image processing scheme, so as to generate and display new combined image data. When the request for the additional photographing of images is not made, the controller 501 ends the panoramic mode.

When there is no discontinuous area, the controller 501 determines whether a request for storing a partial image is being made by the user to store a partial area of the combined image.

When the request for storing the partial image is made, the controller 501 stores the partial area of the combined image data selected by the user and ends the panoramic mode. For example, as illustrated in FIG. 2, when the partial area 203 of the combined image data is selected by the user, the controller 501 may store the selected partial area 203. When the request for storing the partial image is not made, the controller 501 ends the panoramic mode.

After displaying the image data or combined image data, the controller 501 determines whether the request for the additional image photographing is being made by the user. As a result of the determination, when the request for the additional image photographing in made, the controller 501 executes the panoramic mode. The panoramic mode refers to a mode that generates an image including scenery within an angle range among all scenery.

Further, the controller 501 determines whether a request for photographing image data is being made by the user. As a result of the determination, when the request for photographing the image data is made, the controller 501 generates a coordinate corresponding to image data input from the camera 509 and stores the generated coordinate corresponding to the input image data.

Figure 11:
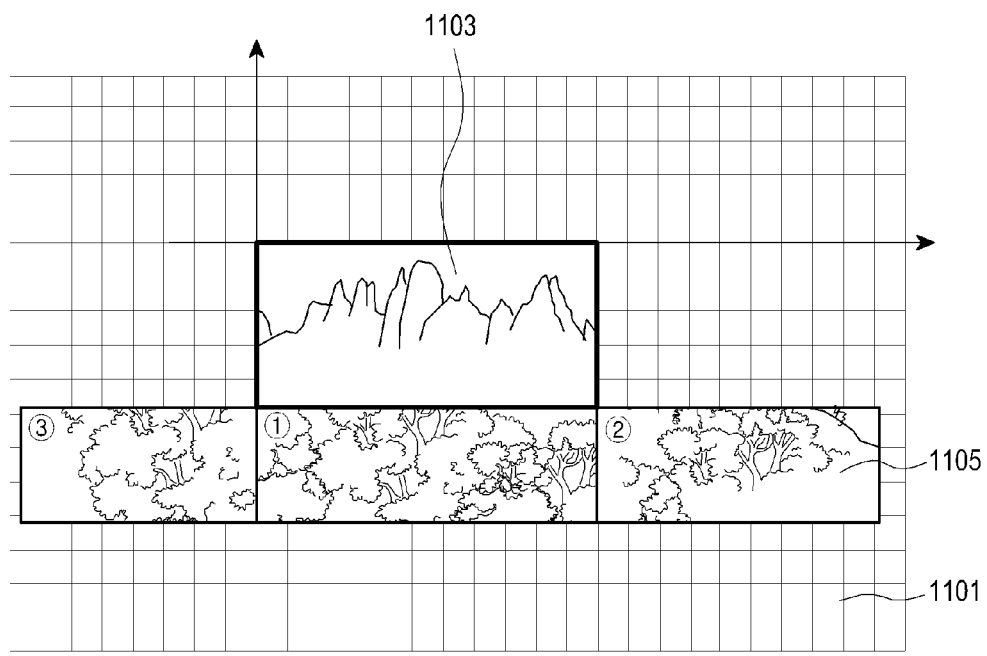
FIG. 11 illustrates a coordinate space where combined image data generated based on image data is placed according to an embodiment of the present disclosure.

At this time, the controller 501 matches a reference coordinate with the displayed image data or combined image data. The reference coordinate refers to a coordinate which is a reference point of a virtual space, for example, (0, 0) of a (x, y) coordinate. For example, as illustrated in FIG. 11, when a request for the additional photographing of images is made by the user, the controller 501 may allocate the reference coordinate (0, 0) to the displayed combined data.

When the image data is second image data photographed after the first image data, the controller 501 receives motion information from the motion detector 511, generates a coordinate based on the received motion information, and matches the coordinate with the second image data. The motion information refers to information on a motion of the portable terminal from a time point when the first image data is photographed to a time point when a request for photographing the second image data is made, and includes a movement direction and a movement angle of the portable terminal.

The controller 501 generates coordinates corresponding to third and fourth image data which are generated after the second image data by using the first to sixth methods. The controller 501 generates a coordinate corresponding to current image data based on a coordinate corresponding to previous image data.

Further, the controller 501 combines a plurality of image data based on a plurality of coordinates corresponding to a plurality of generated image data, so as to generate combined image data. At this time, the controller 510 combines the image data after placing the plurality of image data on a virtual coordinate system based on the plurality of coordinates.

For example, as illustrated in FIG. 11, the controller 501 may place combined image data 1103 and a plurality of image data 1105 on a virtual coordinate system 1101 based on coordinates corresponding to the combined image data 1103 and the plurality of image data 1105 and combine the placed combined image data 1103 and the plurality of placed image data 1105, so as to generate combined image data as shown in a screen 417 of FIGS. 4A and 4B.

The controller 501 determines whether a request for ending the image photographing is being made by the user. As a result of the determination, when the request for ending the image photographing is made, the controller 501 displays combined image data.

Figure 12:
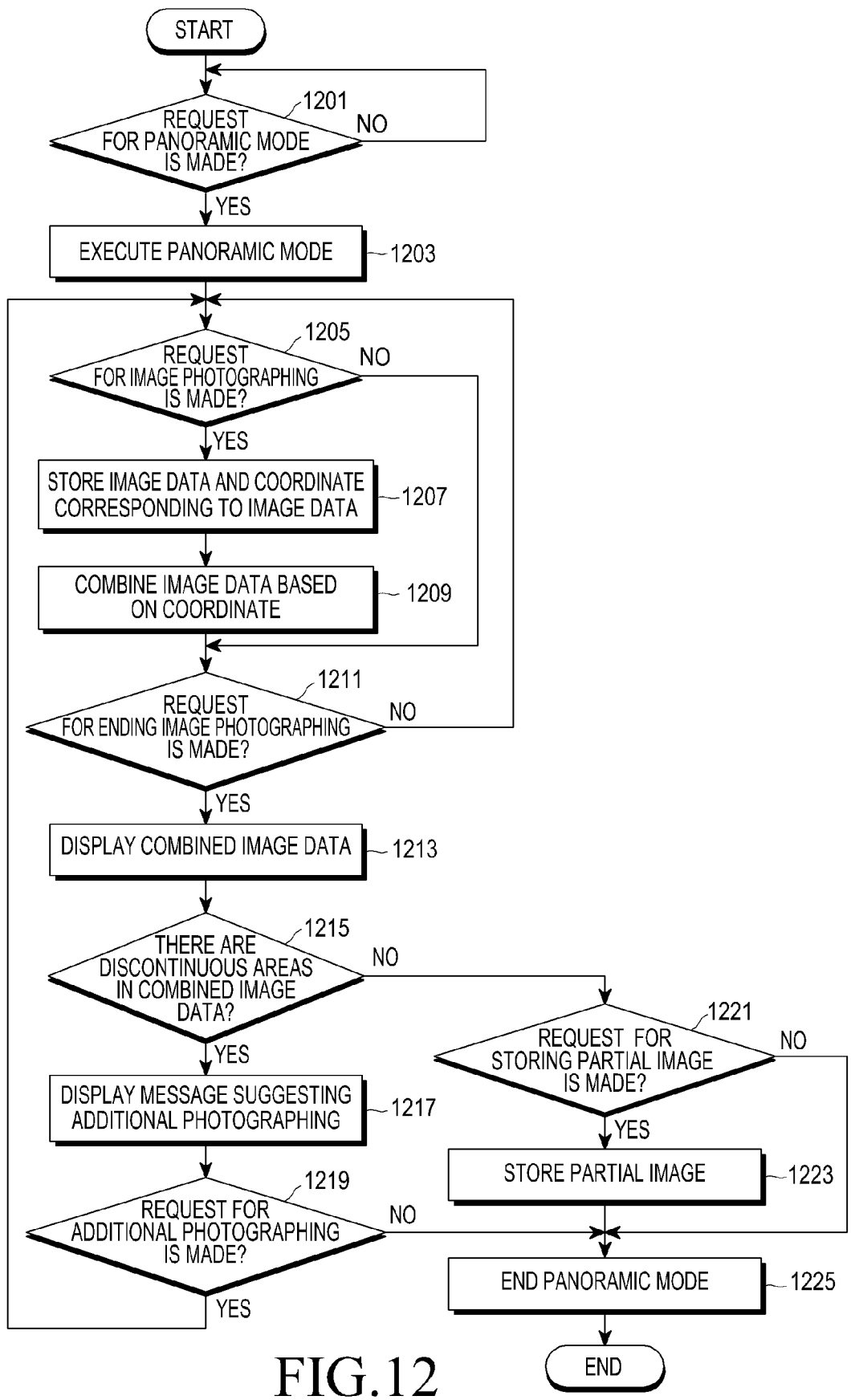
FIG. 12 is a flowchart illustrating a process of generating combined image data in a portable terminal according to a first embodiment of the present disclosure.

FIG. 12 is a flowchart illustrating a process of generating combined image data in the portable terminal according to a first embodiment of the present disclosure.

Referring to FIG. 12, in operation 1201, the controller 501 determines whether the request for the panoramic mode is being made by the user. The panoramic mode refers to a mode that generates an image including scenery within an angle range among all scenery.

At this time, when a request for executing a camera function is made by the user ('YES'), in operation 1201, the controller 501 drives the camera 509, and activates a preview mode to output image data sequentially input from the camera 509 to the display unit 503. The preview mode refers to a mode that displays in advance image data input through the camera 509 to photograph a subject desired by the user. When a plurality of menus including a camera mode menu are displayed and the camera mode menu is selected by the user from the plurality of displayed menus, the controller 501 displays a menu including a general photographic mode and a panoramic mode. When the panoramic mode is selected by the user from the displayed menus, the controller 501 determines that a request for the panoramic mode is made.

As a result of the determination, when the request for the panoramic mode is made, the controller 501 proceeds to operation 1203. Otherwise ('NO'), in operation 1201, the controller 501 repeatedly performs operation 1201.

The controller 501 executes the panoramic mode in operation 1203, and determines whether a request for photographing image data is being made by the user in operation 1205. As a result of the determination, when the request for photographing the image data is made ('YES'), in operation 1205, the controller 501 proceeds to operation 1207. Otherwise ('NO'), in operation 1205, the controller 501 proceeds to operation 1211.

The controller 501 generates a coordinate corresponding to image data input from the camera 509 and stores the generated coordinate corresponding to the input image data in operation 1207, and proceeds to operation 1209.

When the image data corresponds to first image data first photographed while the panoramic mode is executed, the controller 501 matches a reference coordinate with the first image data. The reference coordinate refers to a coordinate which is a reference point of a virtual space, for example, (0, 0) of a (x, y) coordinate. For example, as illustrated in FIGS. 7A and 7B, when the portable terminal receives a request for photographing an image at a first position 701 by the user, the controller 501 may generate first image data and generate a reference coordinate (0, 0) 703 to correspond to the first image data.

When the image data is second image data photographed after the first image data, the controller 501 receives motion information from the motion detector 511, generates a coordinate based on the received motion information, and matches the coordinate with the second image data. The motion information refers to information on a motion of the portable terminal from a time point when the first image data is photographed to a time point when a request for photographing the second image data is made, and includes a movement direction and a movement angle of the portable terminal.

More specifically, the controller 501 generates the coordinate corresponding to the second image data by using three methods below.

A first method generates a coordinate based on an acceleration sensor resolution when a rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

At this time, the controller 501 sets the acceleration sensor resolution as the reference coordinate unit and generates a coordinate by using the movement direction and the movement angle, so as to realize a cylindrical coordinate system 709 as shown in FIGS. 7A and 7B. The basic reference unit in the cylindrical coordinate system 709 refers to a coordinate unit that moves on an x axis or a y axis per acceleration sensor resolution. For example, the basic reference unit may be one box.

For example, when the portable terminal rotates by 0.3 degrees in a right direction and thus moves from a first position 701 to a second position 705 and a request for photographing an image is made at the second position 705 by the user, the controller 501 may generate second image data, receive motion information including a movement direction (right direction) and a movement angle (0.3 degrees) of the portable terminal from the motion detector 511, and generate a coordinate (1, 0) corresponding to the second image data based on the motion information. Alternatively, when the controller 501 receives motion information including a movement direction and a movement angle of the portable terminal corresponding to a left direction and 3 degrees, the controller 501 may generate a coordinate (−10, 0) corresponding to the second image data.

A second method generates a coordinate based on the acceleration sensor resolution and a geomagnetic sensor resolution when the rotary translation and a horizontal translation of the portable terminal are performed. The rotary translation refers to the rotational movement of the portable terminal based on the user, and the horizontal translation refers to a horizontal movement of the portable terminal by the user. The acceleration sensor resolution refers to a minimum movement angle which can be recognized by the acceleration sensor. For example, the acceleration sensor resolution may be 0.3 degrees. The geomagnetic sensor resolution refers to a minimum movement distance which can be recognized by the geomagnetic sensor. For example, the geomagnetic sensor resolution may be 1 cm.

At this time, the controller 501 sets the acceleration sensor resolution and the geomagnetic sensor resolution by the reference coordinate units, respectively, and generates a coordinate by using the movement direction, the movement angle, and the movement distance, so as to realize a long circular coordinate system 809 as shown in FIGS. 8A and 8B. The basic reference unit in the long circular coordinate system 809 refers to a coordinate unit that moves on an x axis or a y axis from a reference coordinate (0, 0) 803 per acceleration sensor resolution or geomagnetic sensor resolution. The For example, the basic reference unit may be one box.

For example, as illustrated in FIGS. 8A and 8B, when the portable terminal rotates by 0.3 degrees in a right direction and moves by 1 cm and thus moves from a third position 801 to a fourth position 805 and a request for photographing an image at the fourth position 805 is made by the user, the controller 501 may generate second image data, receive motion information including a movement direction (right direction), a movement angle (0.3 degrees), and a movement distance (1 cm) of the portable terminal from the motion detector 511, and generate a coordinate (2, 0) 807 corresponding to the second image data based on the motion information. Alternatively, when the controller 501 receives motion information including a movement direction, a movement angle, and a movement distance of the portable terminal corresponding to a left direction, 3 degrees, and 5 cm, the controller 501 may generate a coordinate (−15, 0) corresponding to the second image data.

A third method generates a coordinate based on the acceleration sensor resolution and a distance 905 between a user 901 and a portable terminal 903 when the rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

The controller 501 may receive image data including the user input from a front camera included in the camera 509 and analyze a user image of the received image data, so as to estimate a distance between the user and the portable terminal or estimate the distance between the user and the portable terminal by using a proximity sensor included in the motion detector 511.

The controller 501 calculates the acceleration sensor resolution and the basic coordinate unit corresponding to the acceleration sensor resolution based on the distance between the user and the portable terminal. For example, the controller 501 may calculate the basic coordinate unit by using Equation (1) above.

At this time, the controller 501 sets the acceleration sensor resolution in the reference coordinate unit and generates a coordinate by using the movement direction and the movement angle, so as to realize a circular coordinate system 907 as shown in FIGS. 9A and 9B.

For example, when the portable terminal rotates by 0.3 degrees in a right direction and thus moves from a fifth potion to a sixth position and a request for photographing an image is made at the sixth position by the user, the controller 501 may generate second image data, receive motion information including a movement direction (right direction) and a movement angle (0.3 degrees) of the portable terminal from the motion detector 511, estimate a distance (10 cm) between the user and the portable terminal, and generate a coordinate (0.105, 0) corresponding to the second image data based on the motion information and the estimated distance.

As described above, the controller 501 generates coordinates corresponding to third and fourth image data which are generated after the second image data by using the first to third methods. The controller 501 generates a coordinate corresponding to current image data based on a coordinate corresponding to previous image data. For example, when the portable terminal generates second image data, rotates by 0.3 degrees in a right direction, and a request for photographing third image data is made, the controller 501 may determine that the portable terminal moves one box in an x axis based on the coordinate (1, 0) of the second image data in the coordinate system and generate a coordinate (2, 0) corresponding to the third image data. The controller 501 generates a coordinate corresponding to fourth image data based on the coordinate corresponding to the third image data by repeatedly performing such an operation.

Further, the controller 501 combines a plurality of image data based on a plurality of coordinates corresponding to a plurality of generated image data to generate combined image data in operation 1209, and proceeds to operation 1211. At this time, the controller 510 combines the image data after placing the plurality of image data on a virtual coordinate system based on the plurality of coordinates.

For example, as illustrated in FIG. 6, when coordinates of first to fourth image data are (0,0), (6, 4), (7, −2), and (12, 2), the controller 501 may place the first to fourth image data 603, 605, 607, and 609 on a virtual coordinate system 601 and combines the placed first to fourth image data 603, 605, 607, and 609, so as to generate the combined image data as shown in a screen 101 of FIG. 1. Alternatively, as illustrated in FIG. 10, when coordinates of first and second image data are (0, 0) 1003 and (12, 2) 1005 on the coordinate system 1001, the controller 501 may place, as illustrated in FIG. 11, the first and second image data on a virtual coordinate system 1101 and combine the placed first and second image data 1103 and 1105, so as to generate the combined image data as shown in a screen 301 of FIG. 3.

The controller 501 determines whether a request for ending the image photographing is being made by the user in operation 1211. As a result of the determination, when the request for ending the image photographing is made ('YES'), in operation 1211, the controller 501 proceeds to operation 1213. Otherwise ('NO'), in operation 1211, the controller 501 proceeds to operation 1205.

The controller 501 displays the combined image data in operation 1213, and proceeds to operation 1215. For example, the controller 501 may display the combined image data as shown in the screen 101 of FIG. 1. Alternatively, the controller 501 may display the combined image data as shown in the screen 301 of FIG. 3.

The controller 501 determines whether there are discontinuous areas in the combined image data by analyzing the combined image data. The discontinuous areas refer to areas generated by dividing the combined image data into a plurality of images because there is no image in a partial area of the combined image data. For example, when the combined image data shown in the screen 301 of FIG. 3 is displayed, the controller 501 may determine that there are the discontinuous areas in the combined image data.

As a result of the determination, when there are the discontinuous areas ('YES'), in operation 1215, the controller 501 proceeds to operation 1217. Otherwise ('NO'), in operation 1215, the controller 501 proceeds to operation 1221.

The controller 501 displays a message suggesting additional photographing to fill in the discontinuous areas from the combined image data in operation 1217, and proceeds to operation 1219. For example, when there are the discontinuous areas in the combined image data, the controller 501 may display the popup window 303 including "Would you like to perform additional photographing?", "yes", and "no".

The controller 501 determines whether a request for additional photographing of images is being made by the user in operation 1219. As a result of the determination, when the request for the additional photographing of images is made ('YES'), in operation 1219, the controller 501 proceeds to operation 1205. Otherwise ('NO'), in operation 1219, the controller 501 proceeds to operation 1225.

The controller 501 determines whether a request for storing a partial image is being made by the user to store a partial area of the combined image in operation 1221. As a result of the determination, when the request for storing the partial image is made ('YES'), in operation 1221, the controller 501 proceeds to operation 1223. Otherwise ('NO'), in operation 1221, the controller 501 proceeds to operation 1225.

The controller 501 stores the partial area of the combined image data selected by the user in operation 1223, and proceeds to operation 1225. For example, as illustrated in FIG. 2, when the partial area 203 of the combined image data is selected by the user, the controller 501 may store the selected partial area 203.

In operation 1225, the controller 501 ends the panoramic mode.

Figure 13:
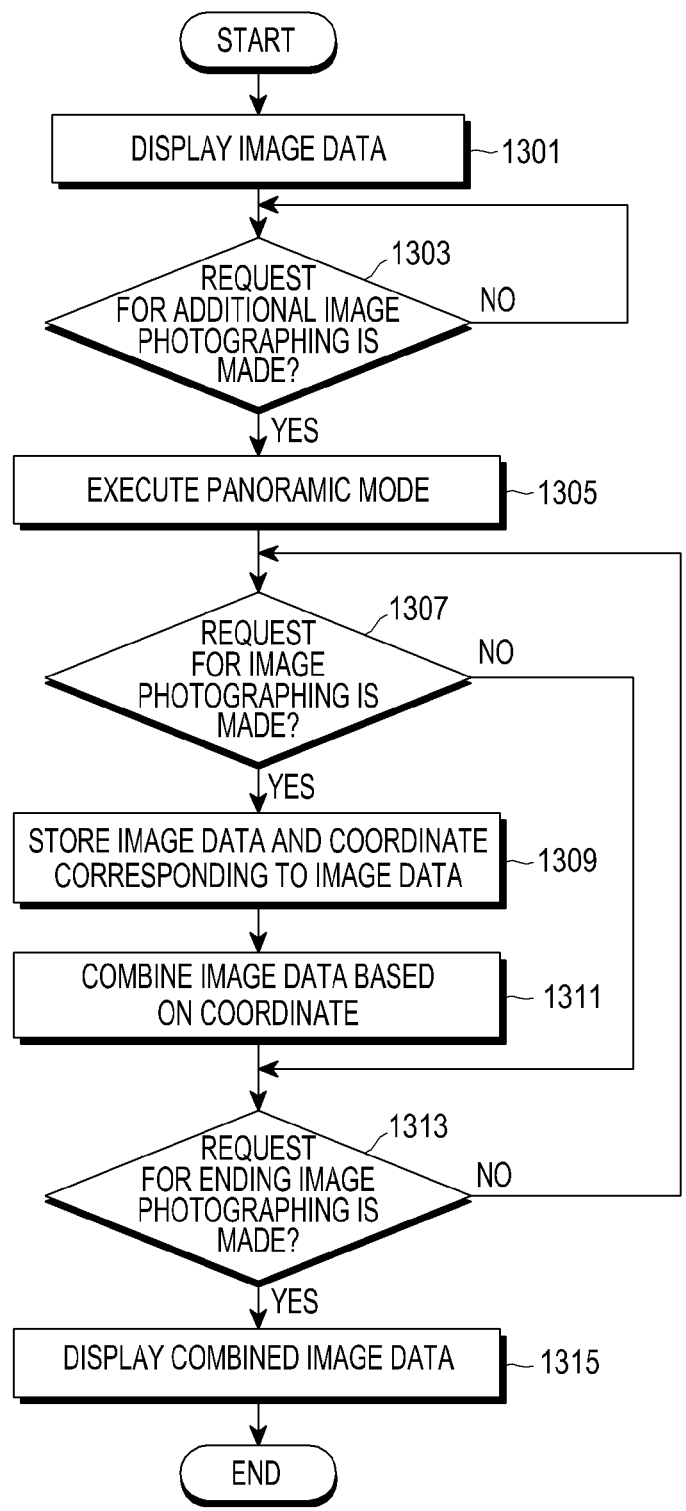
FIG. 13 is a flowchart illustrating a process of generating combined image data based on image data in a portable terminal according to an embodiment of the present disclosure.

FIG. 13 is a flowchart illustrating a process of generating combined image data based on image data in the portable terminal according to an embodiment of the present disclosure.

Referring to FIG. 13, the controller 501 displays image data or combined image data in operation 1301, and determines whether a request for additionally photographing the image is being made by the user in operation 1303. As a result of the determination, when the request for additionally photographing the image is made ('YES'), in operation 1303, the controller 501 proceeds to operation 1305. Otherwise ('NO'), in operation 1303, the controller 501 proceeds to operation 1303.

The controller 501 executes the panoramic mode in operation 1305, and proceeds to operation 1307. The panoramic mode refers to a mode that generates an image including scenery within an angle range among all scenery.

Further, the controller 501 determines whether a request for photographing image data is being made by the user in operation 1307. As a result of the determination, when the request for photographing the image data is made ('YES'), in operation 1307, the controller 501 proceeds to operation 1309. Otherwise ('NO'), in operation 1307, the controller 501 proceeds to operation 1313.

The controller 501 generates a coordinate corresponding to image data input from the camera 509 and stores the generated coordinate corresponding to the input image data in operation 1309, and proceeds to operation 1311.

At this time, the controller 501 matches a reference coordinate with the displayed image data or combined image data. The reference coordinate refers to a coordinate which is a reference point of a virtual space, for example, (0, 0) of a (x, y) coordinate. For example, as illustrated in FIG. 11, when a request for additional photographing of images is made by the user, the controller 501 may allocate the reference coordinate (0, 0) to the displayed combined data.

When the image data is second image data photographed after the first image data, the controller 501 receives motion information from the motion detector 511, generates a coordinate based on the received motion information, and matches the coordinate with the second image data. The motion information refers to information on a motion of the portable terminal from a time point when the first image data is photographed to a time point when a request for photographing the second image data is made, and includes a movement direction and a movement angle of the portable terminal.

The controller 501 generates coordinates corresponding to third and fourth image data which are generated after the second image data by using the first to sixth methods. The controller 501 generates a coordinate corresponding to current image data based on a coordinate corresponding to previous image data.

Further, the controller 501 combines a plurality of image data based on a plurality of coordinates corresponding to a plurality of generated image data to generate combined image data in operation 1311, and proceeds to operation 1313. At this time, the controller 510 combines the image data after placing the plurality of image data on a virtual coordinate system based on the plurality of coordinates.

For example, as illustrated in FIG. 11, the controller 501 may place combined image data 1103 and a plurality of image data 1105 on a virtual coordinate system 1101 based on coordinates corresponding to the combined image data 1103 and the plurality of image data 1105 and combine the placed combined image data 1103 and the plurality of placed image data 1105, so as to generate the combined image data as shown in a screen 417 of FIGS. 4A and 4B.

The controller 501 determines whether a request for ending the image photographing is being made by the user in operation 1313. As a result of the determination, when the request for ending the image photographing is made ('YES'), in operation 1313, the controller 501 proceeds to operation 1315. Otherwise ('NO'), in operation 1313, the controller 501 proceeds to operation 1307.

The controller 501 displays the combined image data in operation 1315.

Figure 14:
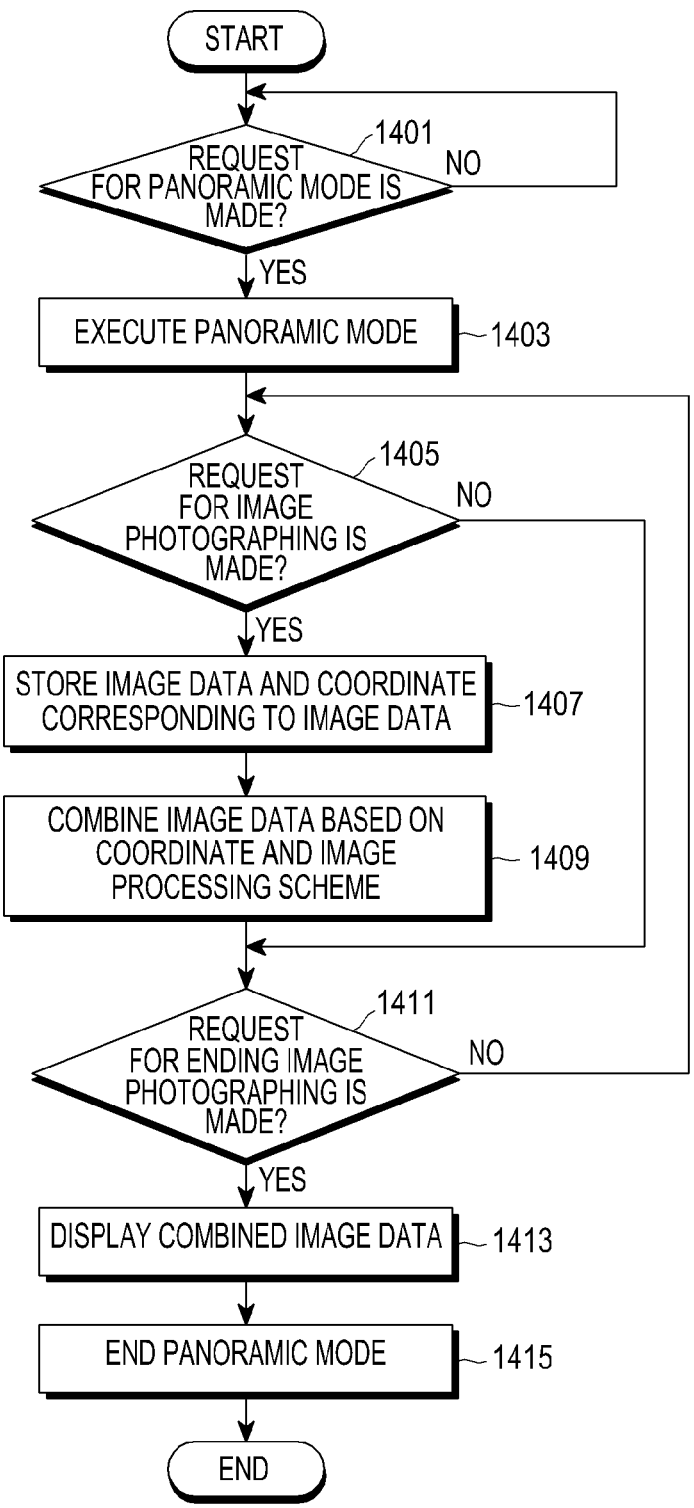
FIG. 14 is a flowchart illustrating a process of generating combined image data in a portable terminal according to a second embodiment of the present disclosure.

FIG. 14 is a flowchart illustrating a process of generating combined image data in the portable terminal according to a second embodiment of the present disclosure.

Referring to FIG. 14, in operation 1401, the controller 501 determines whether a request for a panoramic mode is being made by the user. The panoramic mode refers to a mode that generates an image including scenery within an angle range among all scenery.

As a result of the determination, when the request for the panoramic mode is made ('YES'), in operation 1401, the controller 501 proceeds to operation 1403. Otherwise ('NO'), in operation 1401, the controller 501 repeatedly performs operation 1401. The controller 501 executes the panoramic mode in operation 1403, and proceeds to operation 1405.

Further, the controller 501 determines whether a request for photographing image data is being made by the user in operation 1405. As a result of the determination, when the request for photographing the image data is made ('YES'), in operation 1405, the controller 501 proceeds to operation 1407. Otherwise ('NO'), in operation 1405, the controller 501 proceeds to operation 1411.

The controller 501 generates a coordinate corresponding to image data input from the camera 509 and stores the generated coordinate corresponding to the input image data in operation 1407, and proceeds to operation 1409.

When the image data corresponds to first image data first photographed while the panoramic mode is executed, the controller 501 matches a reference coordinate with the first image data. The reference coordinate refers to a coordinate which is a reference point of a virtual space, for example, (0, 0) of a (x, y) coordinate. For example, as illustrated in FIGS. 7A and 7B, when the portable terminal receives a request for photographing an image at a first position 701 by the user, the controller 501 may generate first image data and generate a reference coordinate (0, 0) 703 to correspond to the first image data.

When the image data is second image data photographed after the first image data, the controller 501 receives motion information from the motion detector 511, generates a coordinate based on the received motion information, and matches the coordinate with the second image data. The motion information refers to information on a motion of the portable terminal from a time point when the first image data is photographed to a time point when a request for photographing the second image data is made, and includes a movement direction and a movement angle of the portable terminal.

At this time, the controller 501 generates a coordinate corresponding to the second image data by using the above described first to third methods. Further, the controller 501 generates coordinates corresponding to third and fourth image data which are generated after the second image data by using the first to third methods.

Further, the controller 501 combines a plurality of image data by using a plurality of coordinates corresponding to a plurality of generated image data and an image processing scheme to generate combined image data in operation 1409, and proceeds to operation 1411. The image processing scheme is a scheme that searches for areas (hereinafter, referred to as "the same areas") having the same images among a plurality of image data, which will not be described in detail since it is an already known technology.

More specifically, the controller 501 places a plurality of image data on a virtual coordinate system based on a plurality of coordinates and searches for the same areas existing among the placed image data by using the image processing scheme. The controller 501 relocates the plurality of image data such that the same areas searched from the plurality of image data overlap each other, and combines the relocated image data.

For example, as illustrated in FIG. 6, when coordinates of the first to fourth image data correspond to (0,0), (6, 4), (7, −2), and (12, 2), the controller 501 may place the first to fourth image data 603, 605, 607, and 609 on the virtual coordinate system 601. The controller 501 may search for the same areas among the placed first to fourth image data 603, 605, 607, and 609 by using the image processing scheme, relocate the first to fourth image data 603, 605, 607, and 609 on the virtual coordinate system 601 such that the same areas searched from the image data overlap each other, and combine the relocated first to fourth image data 603, 605, 607, and 609, so as to generate combined image data as shown in the screen 101 of FIG. 1.

The controller 501 determines whether a request for ending the image photographing is being made by the user in operation 1411. As a result of the determination, when the request for ending the image photographing is made ('YES'), in operation 1411, the controller 501 proceeds to operation 1413. Otherwise ('NO'), in operation 1411, the controller 501 proceeds to operation 1405.

The controller 501 displays combined image data in operation 1413, and proceeds to operation 1415. For example, the controller 501 may display the combined image data as shown in the screen 101 of FIG. 1. In operation 1415, the controller 501 ends the panoramic mode.

Figure 15:
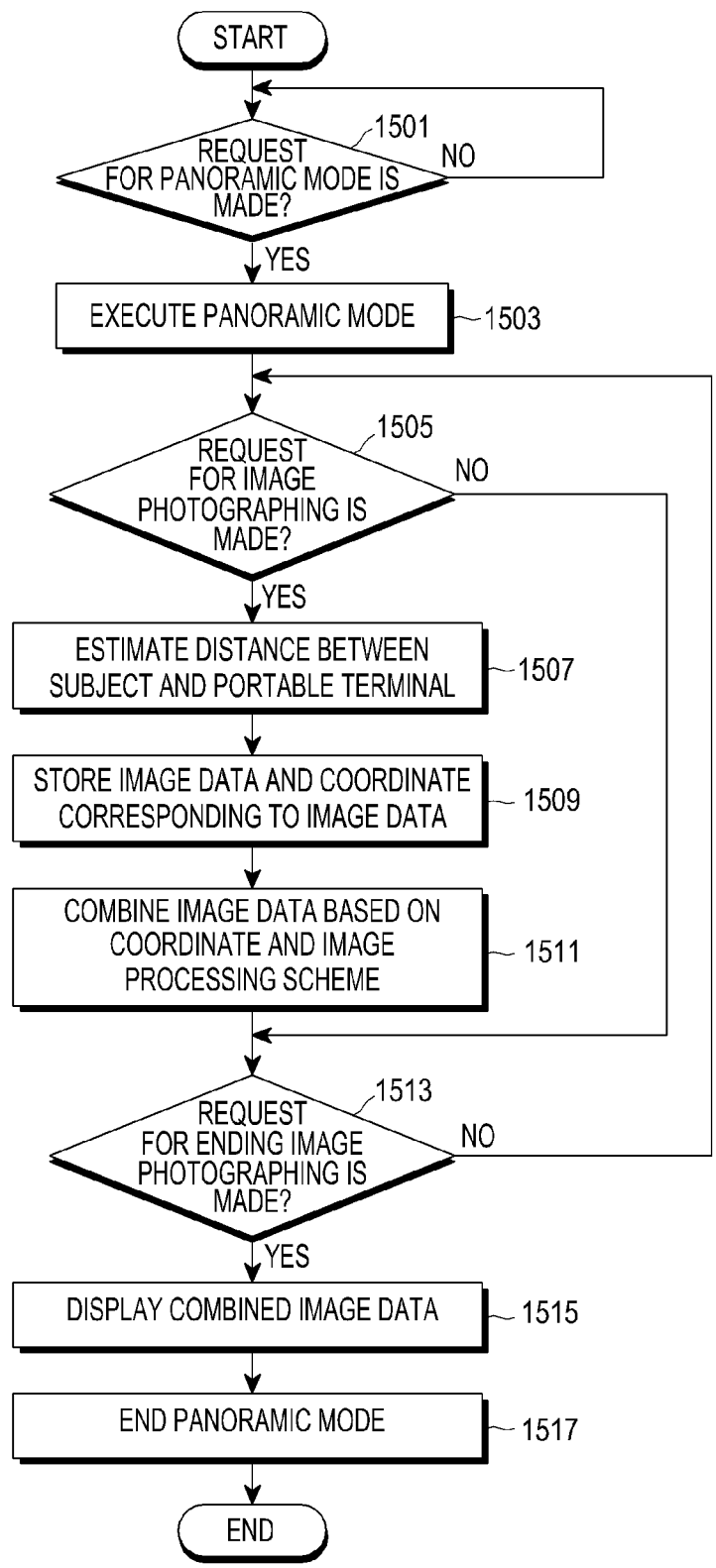
FIG. 15 is a flowchart illustrating a process of generating combined image data in a portable terminal according to a third embodiment of the present disclosure.

FIG. 15 is a flowchart illustrating a process of generating combined image data in the portable terminal according to a third embodiment of the present disclosure.

Referring to FIG. 15, in operation 1501, the controller 501 determines whether a request for a panoramic mode is being made by the user. The panoramic mode refers to a mode that generates an image including scenery within an angle range among all scenery. As a result of the determination, when the request for the panoramic mode is made ('YES'), in operation 1501, the controller 501 proceeds to operation 1503. Otherwise ('NO'), in operation 1501, the controller 501 repeatedly performs operation 1501.

The controller 501 executes the panoramic mode in operation 1503, and proceeds to operation 1505. Further, the controller 501 determines whether a request for photographing image data is being made by the user in operation 1505. As a result of the determination, when the request for photographing the image data is made ('YES'), in operation 1505, the controller 501 proceeds to operation 1507. Otherwise ('NO'), in operation 1505, the controller 501 proceeds to operation 1513.

The controller 501 estimates a distance between a subject and the portable terminal in operation 1507, and proceeds to operation 1509. At this time, the controller 501 receives image data including the subject, detects a particular object included in the image data, and estimates a distance between the subject and the portable terminal based on a size of the detected particular object.

For example, when the memory 505 stores Table 1 showing the distance between the portable terminal and the subject for each size of the particular object, the controller 501 may estimate the distance between the subject and the portable terminal based on Table 1.

The controller 501 generates a coordinate corresponding to image data input from the camera 509 and stores the generated coordinate corresponding to the input image data in operation 1509, and proceeds to operation 1511.

When the image data corresponds to first image data first photographed while the panoramic mode is executed, the controller 501 matches a reference coordinate with the first image data. The reference coordinate refers to a coordinate which is a reference point of a virtual space, for example, (0, 0) of a (x, y) coordinate. For example, as illustrated in FIGS. 7A and 7B, when the portable terminal receives a request for photographing an image at a first position 701 by the user, the controller 501 may generate first image data and generate a reference coordinate (0, 0) 703 to correspond to the first image data.

When the image data is second image data photographed after the first image data, the controller 501 receives motion information from the motion detector 511, generates a coordinate based on the received motion information and the estimated distance between the subject and the portable terminal, and matches the coordinate with the second image data. The motion information refers to information on a motion of the portable terminal from a time point when the first image data is photographed to a time point when a request for photographing the second image data is made, and includes a movement direction and a movement angle of the portable terminal.

More specifically, the controller 501 generates the coordinate corresponding to the second image data by using three methods below.

A fourth method generates a coordinate based on the distance between the subject and the portable terminal and the acceleration sensor resolution when the rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

The controller 501 determines the basic coordinate unit based on the distance between the subject and the portable terminal and the acceleration sensor resolution and generates a coordinate by using a movement direction and a movement angle, so as to implement a cylindrical coordinate system. The basic coordinate unit in the cylindrical coordinate system refers to a coordinate unit that moves on an x axis or a y axis per acceleration sensor resolution. For example, the controller 501 may determine the basic coordinate unit by using Equation (2) above.

Alternatively, when the distance between the subject and the portable terminal is 1,000 cm and the portable terminal rotates by 0.3 degrees in a right direction and thus moves from a seventh potion to an eighth position and a request for photographing an image is made at the eighth position by the user, the controller 501 may generate second image data, receive motion information including a movement direction (right direction) and a movement angle (0.3 degrees) of the portable terminal from the motion detector 511, and generate a coordinate (10.5, 0) corresponding to the second image data based on the distance between the subject and the portable terminal, the motion information and, the estimated distance.

A fifth method generates a coordinate based on the distance between the subject and the portable terminal, the acceleration sensor resolution, and the geomagnetic sensor resolution when the rotary translation and the horizontal translation of the portable terminal are performed. The rotary translation refers to the rotational movement of the portable terminal based on the user, and the horizontal translation refers to a horizontal movement of the portable terminal by the user. The acceleration sensor resolution refers to a minimum movement angle which can be recognized by the acceleration sensor. For example, the acceleration sensor resolution may be 0.3 degrees. The geomagnetic sensor resolution refers to a minimum movement distance which can be recognized by the geomagnetic sensor. For example, the geomagnetic sensor resolution may be 1 cm.

The controller 501 may determine a first basic coordinate unit based on the geomagnetic sensor resolution, determine a second basic coordinate unit based on the acceleration sensor resolution and the distance between the subject and the portable terminal, and generate a coordinate by using a movement direction, a movement angle, and a movement distance, so as to implement a long circular coordinate system. The first basic coordinate unit refers to a coordinate unit that moves an x axis per geomagnetic sensor resolution in the coordinate system, and the second basic coordinate unit refers to a coordinate unit that moves on an x axis or a y axis per acceleration sensor resolution in the coordinate system. For example, the first basic coordinate unit may be one box, and the second basic coordinate unit may be determined by using Equation (2).

For example, when the distance between the subject and the portable terminal is 1,000 cm and the portable terminal rotates by 0.3 degrees in a right direction and moves by 1 cm and thus moves from a ninth potion to a tenth position and a request for photographing an image is made at the tenth position by the user, the controller 501 may generate second image data, receive motion information including a movement direction (right direction), a movement angle (0.3 degrees), and a movement distance (1 cm) of the portable terminal from the motion detector 511, and generate a coordinate (11.05, 0) corresponding to the second image data based on the distance between the subject and the portable terminal and the motion information.

A sixth method generates a coordinate based on the acceleration sensor resolution, a distance between the user and the portable terminal, and a distance between the subject and the portable terminal when the rotary translation of the portable terminal is performed. The rotary translation refers to a rotational movement of the portable terminal based on the user. The acceleration sensor resolution refers to a minimum movement angle which can be recognized by the acceleration sensor. For example, the acceleration sensor resolution may be 0.3 degrees.

The controller 501 may receive image data including the user input from a front camera included in the camera 509 analyzes a user image of the received image data, so as to estimate a distance between the user and the portable terminal or estimate the distance between the user and the portable terminal by using a proximity sensor included in the motion detector 511.

The controller 501 calculates the basic coordinate unit corresponding to the acceleration sensor resolution based on the acceleration sensor resolution, the distance between the user and the portable terminal, and the distance between the subject and the portable terminal. For example, the controller 501 may calculate the basic coordinate unit by using Equation (3) above.

As described above, the controller 501 determines the basic coordinate unit based on the acceleration sensor resolution, the distance between the user and the portable terminal, and the distance between the subject and the portable terminal and generates a coordinate by using a movement direction and a movement angle, so as to implement a circular coordinate system.

For example, when the portable terminal rotates by 0.3 degrees in a right direction and thus moves from an eleventh position to a twelfth position and a request for photographing an image is made at the twelfth position by the user, the controller 501 may generate second image data, receive motion information including a movement direction (right direction) and a movement angle (0.3 degrees) of the portable terminal from the motion detector 511, estimate a distance (10 cm) between the user and the portable terminal and a distance (1,000 cm) between the subject and the portable terminal, and generate a coordinate (10,577, 0) corresponding to the second image data based on the motion information and the estimated distances.

As described above, the controller 501 generates coordinates corresponding to third and fourth image data which are generated after the second image data by using the fourth to sixth methods. The controller 501 generates a coordinate corresponding to current image data based on a coordinate corresponding to previous image data.

Further, the controller 501 combines a plurality of image data by using a plurality of coordinates corresponding to a plurality of generated image data and an image processing scheme to generate combined image data in operation 1511, and proceeds to operation 1513. The image processing scheme corresponds to a scheme that searches for the same areas among a plurality of image data, and a detailed description of the image processing scheme will not be made since it is an already known technology.

More specifically, the controller 501 places a plurality of image data on a virtual coordinate system based on a plurality of coordinates and searches for the same areas existing among the placed image data by using the image processing scheme. The controller 501 relocates the plurality of image data such that the same areas searched from the plurality of image data overlap each other, and combines the relocated image data.

For example, as illustrated in FIG. 6, when coordinates of the first to fourth image data correspond to (0,0), (6, 4), (7, −2), and (12, 2), the controller 501 may place the first to fourth image data 603, 605, 607, and 609 on the virtual coordinate system 601. The controller 501 may search for the same areas among the placed first to fourth image data 603, 605, 607, and 609 by using the image processing scheme, relocate the first to fourth image data 603, 605, 607, and 609 on the virtual coordinate system 601 such that the same areas searched from the image data overlap each other, and combine the relocated first to fourth image data 603, 605, 607, and 609, so as to generate combined image data as shown in the screen 101 of FIG. 1.

The controller 501 determines whether a request for ending the image photographing is being made by the user in operation 1513. As a result of the determination, when the request for ending the image photographing is made ('YES'), in operation 1513, the controller 501 proceeds to operation 1515. Otherwise ('NO'), in operation 1513, the controller 501 proceeds to operation 1505.

The controller 501 displays combined image data in operation 1515, and proceeds to operation 1517. For example, the controller 501 may display the combined image data as shown in the screen 101 of FIG. 1.

In operation 1517, the controller 501 ends the panoramic mode.

Through the operation, the present disclosure may provide a method and an apparatus for generating image data which combine a plurality of image data into combined image data based on coordinates, so as to combine a plurality of photographed image data regardless of sequences. Further, the present disclosure may provide a method and an apparatus for generating image data which combine a plurality image data into combined image data based on coordinates, so as to generate combined image data based on the already stored images.

A method of generating image data in a portable terminal according to the present disclosure may be implemented by a computer-readable code in a computer-readable recording medium. The computer-readable recording medium includes all the types of recording devices in which data readable by a computer system are stored. As for such a recording medium, for example, a ROM, a RAM, an optical disc, a magnetic tape, a floppy disc, a hard disc, or a non-volatile memory may be used, and a medium implemented in a type of carrier wave (for example, transmission through the Internet) may also be included in such a recording medium. In addition, the computer-readable recording medium may be stored with codes which are distributed in computer systems connected by a network such that the codes can be read and executed by a computer in a distributed method.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for generating image data in a portable terminal, the apparatus comprising:
   a display unit configured to display combined image data;
   a motion detector configured to, when a request for photographing an image is made, detect a motion of the portable terminal and generate motion information; and
   a controller configured to:
   match a reference coordinate with first image data among the plurality of image data,
   generate a coordinate of second image data by using the motion information of the portable terminal, a distance between the portable terminal and a user or a subject, and the reference coordinate,
   combine the plurality of image data based on the reference coordinate and the coordinate of the second image data to generate the combined image data, and
   display the combined image data.

2. The apparatus of claim 1, wherein the controller is further configured to:
   match the reference coordinate with the first image data among the plurality of image data, and
   generate the coordinate of the second image data by using the motion information and the reference coordinate.

3. The apparatus of claim 1, wherein the motion information corresponds to information on the motion of the portable terminal from a position where the first image data among the plurality of image data is photographed to a position where the second image data is photographed.

4. The apparatus of claim 1, wherein the controller is further configured to:
   generate the coordinate of the second image data by using the motion information, the distance between the portable terminal and the user, the distance between the portable terminal and the subject, and the reference coordinate.

5. The apparatus of claim 1, wherein the controller is further configured to combine the plurality of image data based on the reference coordinate, the coordinate of the second image data and an image processing scheme to generate the combined image data.

6. The apparatus of claim 1, wherein, when a request for storing a partial area of the combined image data is made, the controller is further configured to store the partial area.

7. The apparatus of claim 1, wherein, when a request for additionally photographing the combined image data is made, the controller is further configured to combine the combined image data and one or more image data photographed by a user to generate and display new combined image data.

8. The apparatus of claim 7, wherein the controller is further configured to:
   match a reference coordinate with the combined image data,
   generate coordinates corresponding to the one or more image data based on the motion information, and
   combine the combined image data and the one or more image data based on the reference coordinate of the combined image data and the coordinates of the one or more image data to generate the new combined image data.

9. A method of generating image data in a portable terminal, the method comprising:
   detecting, when a request for photographing an image is made, a motion of the portable terminal and generating motion information;
   matching a reference coordinate with first image data among the plurality of image data;
   generating a coordinate of second image data by using the motion information of the portable terminal, a distance between the portable terminal and a user or a subject, and the reference coordinate;
   combining the plurality of image data based on the reference coordinate and the coordinate of the second image data to generate combined image data; and
   displaying the combined image data.

10. The method of claim 9, wherein the generating of the coordinates comprises:
    matching the reference coordinate with the first image data among the plurality of image data; and
    generating the coordinate of the second image data by using the motion information and the reference coordinate.

11. The method of claim 9, wherein the motion information corresponds to information on the motion of the portable terminal from a position where the first image data among the plurality of image data is photographed to a position where the second image data is photographed.

12. The method of claim 9, wherein the generating of the coordinate comprises:
    generating the coordinate of the second image data by using the motion information, the distance between the portable terminal and the user, the distance between the portable terminal and the subject, and the reference coordinate.

13. The method of claim 9, wherein the generating of the combined image data comprises combining the plurality of image data based on the reference coordinate, the coordinate of the second image data and an image processing scheme to generate the combined image data.

14. The method of claim 9, further comprising, when a request for storing a partial area of the combined image data is made, storing the partial area.

15. The method of claim 9, further comprising, when a request for additionally photographing the combined image data is made, combining the combined image data and one or more image data photographed by a user to generate and display new combined image data.

16. The method of claim 15, wherein the generating and displaying of the new combined image data comprises:
- matching a reference coordinate with the combined image data;
- generating coordinates corresponding to one or more image data based on the motion information; and
- combining the combined image data and the one or more image data based on the reference coordinate of the combined image data and the coordinates of the one or more image data to generate the new combined image data.

17. The method of generating the image data in the portable terminal of claim 9, wherein each coordinate of the coordinates corresponding to the plurality of image data based on the motion information is a coordinate unit of a long circular coordinate system where the coordinate unit moves on one of an x axis and a y axis from a reference coordinate corresponding to one of an acceleration resolution and a geomagnetic resolution in the coordinate system.

* * * * *